United States Patent
Fujita et al.

(12) 
(10) Patent No.: US 6,303,669 B1
(45) Date of Patent: *Oct. 16, 2001

(54) FLEXIBLE POLYURETHANE FOAM

(75) Inventors: Naoshi Fujita; Minoru Suzuki; Kenichi Katoh; Satoshi Kondo, all of Aichi (JP)

(73) Assignee: Inoac Corporation, Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,619

(22) Filed: Apr. 30, 1997

(30) Foreign Application Priority Data

| | | |
|---|---|---|
| May 9, 1996 | (JP) | 8-140850 |
| Jan. 31, 1997 | (JP) | 9-033087 |

(51) Int. Cl.⁷ .............. C08J 9/04; C08G 18/42; C08G 18/48; C08G 18/71
(52) U.S. Cl. .......... 521/173; 521/110; 521/117; 521/128; 521/137; 521/163; 521/160
(58) Field of Search .................. 521/110, 117, 521/128, 163, 137, 173, 160

(56) References Cited

U.S. PATENT DOCUMENTS

| | | | |
|---|---|---|---|
| 3,664,976 | | 5/1972 | Evans et al. .......... 428/318.8 |
| 4,264,743 | * | 4/1981 | Maruyama et al. .......... 521/101 |
| 4,323,657 | | 4/1982 | Mazanek et al. .......... 521/116 |
| 4,374,935 | | 2/1983 | Decker et al. .......... 521/173 |
| 4,568,717 | | 2/1986 | Speranza et al. .......... 524/762 |
| 4,639,471 | * | 1/1987 | Hirai et al. .......... 521/172 |
| 4,656,196 | * | 4/1987 | Kelly et al. .......... 521/52 |
| 4,670,477 | * | 6/1987 | Kelly et al. .......... 521/52 |
| 4,731,392 | * | 3/1988 | Streu et al. .......... 521/172 |
| 4,778,830 | * | 10/1988 | Streu et al. .......... 521/172 |
| 4,798,851 | * | 1/1989 | Werner et al. .......... 521/137 |
| 4,950,695 | * | 8/1990 | Stone .......... 521/157 |
| 5,077,373 | * | 12/1991 | Tsuda et al. .......... 528/83 |

FOREIGN PATENT DOCUMENTS

| | | |
|---|---|---|
| 2066503 | 10/1992 | (CA) . |
| 337614 | 10/1989 | (EP) . |
| 0 795 583 | 9/1997 | (EP) . |
| 5235077 | 9/1977 | (JP) . |
| 255470 | 11/1990 | (JP) . |
| 326694 | 4/1991 | (JP) . |
| 7-25974 | 1/1995 | (JP) . |
| 7025974 | 5/1995 | (JP) . |
| 8-33095 | 2/1996 | (JP) . |
| 8033095 | 2/1996 | (JP) . |

OTHER PUBLICATIONS

92–354788 & JP 04 258 630, Database WPI Section Ch, Week 9243 Derwent Publication Ltd., London, GB; Class A25, Sep. 14, 1992, 1 page.

\* cited by examiner

*Primary Examiner*—Rabon Sergent
(74) *Attorney, Agent, or Firm*—Sughrue, Mion, Zinn, Macpeak & Seas, PLLC

(57) ABSTRACT

The present invention provides a flexible polyurethane foam having good resistance to wet heat aging and resistance to ozone deterioration and a speaker edge having an excellent waterproofness comprising such a flexible polyurethane foam. As a polyol, a polyol component obtained by mixing a polyester polyol having an excellent compatibility with polyether polyol such as adipate of a long-chain alkylene glycol having at least 5 carbon atoms with a foaming agent, a catalyst, a foam stabilizer, etc. is reacted with a polyisocyanate to obtain a flexible polyurethane foam having good resistance to wet heat aging and resistance to ozone deterioration. Further, the incorporation of a specific aromatic secondary amine compound, a monofunctionally-terminated compound and an ultraviolet absorbent in the foam composition makes it possible to obtain a flexible foam having better resistance to ozone deterioration and weather resistance. The flexible foam can provide a speaker edge having a small drop of strength and elongation due to compression molding and excellent waterproofness and weather resistance in combination.

22 Claims, 3 Drawing Sheets

FLEXIBLE POLYURETHANE FOAM

FIELD OF THE INVENTION

The present invention relates to a flexible polyurethane foam (hereinafter referred to as "flexible foam") which can hardly be hydrolyzed and shows a small drop of tensile strength, etc. even after exposure to ozone. The present invention also relates to a flexible foam which exhibits further improvements in physical properties such as tensile strength and elongation, suffers little deterioration due to ultraviolet rays, etc., and has a proper air permeability, a good formability and an excellent waterproofness. The present invention further relates to a speaker edge made of a flexible foam excellent in these various properties. The flexible foam of the present invention can find wide application, e.g., speaker edge as well as soundproofing material for hard disc apparatus, damping material, roll and sealant for toner cartridge in various printers, etc.

BACKGROUND OF THE INVENTION

Flexible foams are divided into two groups, i.e., foam comprising a polyester polyol (hereinafter referred to as "polyester foam") and foam comprising a polyether polyol (hereinafter referred to as "polyether foam"). The characteristics of these foams are drastically affected by the polyol used. Thus, these foams essentially differ in mechanical and chemical properties depending on the molecular structure of polyol, the intramolecular cohesive force of foam, etc.

The polyester foam has small cells, an excellent appearance and a great tensile strength and elongation. With respect to elongation after compression molding in particular, the polyester foam is very superior to the polyether foam. The polyester foam is also excellent in oil resistance and solvent resistance and chemically stable. Further, the polyester foam exhibits good heat resistance and weather resistance. However, the polyester foam has a great disadvantage that it shows a strength drop due to hydrolysis of ester bond attributed to polyester polyol used for the production of foam. The inhibition of hydrolysis will be hereinafter referred to as "resistance to wet heat aging". The polyester foam is further disadvantageous in that it suffers a relatively great hysteresis loss and thus is not suitable for use as cushioning material.

On the other hand, the polyether foam is very superior to the polyester foam with respect to hydrolysis. The polyether foam is also excellent in flexibility, restorability, etc. However, the polyether foam is inferior to the polyester foam with respect to oil resistance, solvent resistance, etc. Further, a polyether foam having a very low air permeability can be hardly obtained. Moreover, the polyether foam exhibits a small tensile strength and elongation. In particular, the polyether foam shows a great drop of strength and elongation after compression molding. Further, the polyether foam is considerably inferior to the polyester foam with respect to resistance to ozone deterioration. At present, therefore, the polyether foam yields to the polyester foam in many practical uses despite its advantage that it can be hardly hydrolyzed and exhibits an excellent resistance to wet heat aging. The inhibition of ozone deterioration will be hereinafter referred to as "resistance to ozone deterioration". Further, the polyether foam is inferior to the polyester foam with respect to resistance to deterioration by ultraviolet ray, etc. (The inhibition of deterioration by ultraviolet ray, etc. will be hereinafter referred to as "weather resistance".)

The flexible foam is essentially porous. Even when compressed under heating, the flexible foam cannot be provided with desired waterproofness regardless of whether it is of ester or ether type. In order to solve the problem of waterproofness, the following approaches have been proposed.

(i) A method which comprises providing a waterproof film on the surface of the flexible foam (ii) A method which comprises impregnating the flexible foam with an emulsion of a fluororesin, and then drying the flexible foam to remove water therefrom, thereby rendering the flexible foam water-repellent However, the method (i) is disadvantageous in that it is difficult to form a homogeneous water-impermeable film on the surface of a flexible foam having numerous micropores. Further, as the material constituting the film there is often used a low heat-resistance material. A film formed of such a material can soften and melt to destruction when compressed under heating. Moreover, this method adds to cost. On the other hand, the method (ii) is disadvantageous in that it is considerably difficult to uniformly impregnate a flexible foam having the low air permeability with an emulsion of a fluororesin to enhance its waterproofness. Even if such a flexible foam can be uniformly impregnated with an emulsion of a fluororesin, it is difficult to completely remove water content from the foam, making it easy to render the waterproofness heterogeneous. Further, such an emulsion of a fluororesin is very expensive. Thus, the resulting foam, too, is very expensive.

It has been attempted to develop a foam having advantages of polyester foam and polyether foam in combination by the combined use of a polyester polyol and a polyether polyol. However, the two general-purpose polyols are poorly compatible with each other. Thus, the two polyols cannot be uniformly mixed and hence suffer phase separation that makes it impossible to provide a normal foam unless the mixing proportion of the polyester polyol is at least 50% by weight, particularly at least 80% by weight. The incorporation of a large amount of the polyester polyol makes it impossible to provide a foam well-balanced in physical properties. For the details of disadvantages caused by the mixing of a polyether polyol and a polyester polyol, reference can be made to Iwata, "Handbook of Polyurethane Resin", Nikkan Kogyo Shinbunsha, 1987, page 160. It is reported in this reference that the mixing of a slight amount of a polyether polyol in a polyester polyol during the preparation of a flexible polyurethane foam makes it impossible to obtain a normal cell, having a delicate effect on the cell conditions. Thus, when the foregoing two types of polyols are used in admixture to prepare a flexible urethane foam, the foam stability of which is important because its expansion rate is high, the resulting foam have cracks or voids. In some extreme cases, the foam can be destroyed, giving troubles in the production line.

It has been attempted to enhance the properties of a foam by the use of a polyether polyol having an ester bond incorporated therein. Further, a method which comprises using a special polyol such as phosphorus-containing polyester polyol in combination with a specific foam stabilizer and a method which comprises using a hydroxyl-terminated prepolymer or isocyanate-terminated prepolymer have been proposed. In a technical field of connecting a foam to a surface layer made of a polyvinyl chloride or the like by molding, the combined use of a specific polyester polyol and a polyether polyol has been proposed.

However, these proposed methods are conducted in restricted fields such as filter foam free of cell membrane (JP-B-52-35077 (the term "JP-B" as used herein means an "examined Japanese patent publication"), JP-A-55-27315

(the term "JP-A" as used herein means an "unexamined published Japanese patent application"), etc.) and semirigid foam (JP-B-3-26694, JP-A-62-148516, etc.). These proposed methods are not put into practical use in the technical field of ordinary flexible foam. The preparation of the foregoing specific polyester polyol comprising a polyether polyol having an ester bond incorporated therein requires a complicated procedure. Thus, the resulting polyester polyol is expensive. If such a polyester polyol is used singly, the properties of the resulting foam cannot be widely varied. Further, the concentration of ester groups which can be incorporated into the foam is too low to provide a sufficient enhancement in the physical properties of the foam. U.S. Pat. No. 4,374,935 discloses that a mixture of a specific polyester polyol and a polyether polyol is used to improve hydrolysis resistance and mechanical properties such as compression strength of a flexible urethane foam. The specific polyester polyol can be obtained by the polycondensation of an organic dicarboxylic acid with a specific polyol mixture. However, this invention has excellent damping properties and thus is suitable for molding into automobile sheet. Further, this specific polyester polyol contains (or must contain) 1,4-butanediol during polycondensation. Thus, the resulting enhancement of hydrolysis resistance is limited to 5 days of exposure to 85° C. moist atmosphere. No studies have been made of higher resistance to wet heat aging and resistance to ozone deterioration. With reference to application of sealing material, JP-B-2-55470 (filed by NHK Spring Co., Ltd.) discloses a process for the preparation of a flexible or semi-rigid open-cell type sealing material which comprises the use of at least one selected from the group consisting of dimeric acid polyol, castor oil polyol and polyether polyol obtained by the addition polymerization of at least 90 mol % of an alkylene oxide having at least 3 carbon atoms. However, no reference is specifically made to the mixing of a polyether polyol and a polyester polyol. Further, no studies are made of hydrolysis resistance (resistance to wet heat aging) or resistance to ozone deterioration.

A flexible foam finds wide application. In particular, a polyester foam has heretofore been often used as a material of speaker edge. A speaker comprises a cone paper, a voice coil connected to the cone paper for driving the cone paper, a magnet for driving the voice coil, and a flame for fixing the magnet. The speaker edge is a member which connects the cone paper to the flame in such an arrangement that the cone paper can be freely vibrated. At present, as such a membrane there is used a press-molded flexible foam, thermoformed resin-impregnated fabric or formed rubber or thermoplastic resin sheet.

The speaker edge has the following requirements:
  (i) The speaker edge must be so flexible as not to prevent free vibration of the cone paper;
  (ii) The speaker edge must be longitudinally flexible to retain the cone paper at the predetermined position, prevent the voice coil and magnet from coming in contact with the flame and maintain linear vibration but must be crosswise rigid to support the weight of the speaker cone and voice coil; and
  (iii) The speaker edge must have a low air permeability to sound-insulate the interior of the speaker box from the exterior, minimize the diffraction of sound, enhance the sound pressure at a bass range and improve the quality of the sound reproduced by the speaker.

As the material of the speaker edge there has heretofore been mainly used a polyester foam. This speaker edge can be normally obtained by cutting a sheet having a thickness of about 10 mm out of a flexible slab foam, and then compression-molding the sheet in a molding machine which has been controlled to a temperature of 200° C. The speaker edge thus obtained is then connected to the cone paper and flame. The speaker edge made of a flexible foam meets the foregoing various requirements and has the following advantages as compared with speaker edges made of other materials.
  (i) Since this speaker edge is light and flexible, it can exhibit a maintained reproduction efficiency when applied to a small diameter speaker. Further, since this speaker edge produces little sound, a good quality reproduced sound having little noise can be obtained.
  (ii) This speaker edge can be three-dimensionally formed to cope with a wide range of amplitudes.
  (iii) The material of the speaker edge has an excellent stretchability itself. Thus, the resulting speaker exhibits little deterioration of sound quality due to edge creep when a large sound is reproduced. At the same time, the cone paper can follow the large output of sound at a bass range. Thus, a large sound can be produced from a speaker having a relatively small diameter.
  (iv) The hardness, strength and other properties of the speaker edge can be easily varied by controlling the compression factor during compression molding. By changing the compression factor, the lowest resonance frequency caused by the weight of various members and other variations can be controlled.
  (v) The raw material and the compression molding do not cost much.

In recent years, however, most automobiles have an on-board audio system. Thus, the recent speaker edge must have an even better durability. In particular, automobile doors having a speaker provided on its trim have been employed more and more. Thus, rainwater and other water contents can enter into the speaker through the gap between the door trim and the outer plate, resulting in an unexpected rise of humidity therein. Therefore, the flexible foam, which is essentially a porous material, can not form a speaker edge having a desired waterproofness even when thermoformed regardless of whether it is of ester or ether. It has been made clear that when a speaker edge made of polyester foam is used, its resistance to deterioration under wet heat becomes very important. Further, from the standpoint of weather resistance, even a speaker comprising a speaker edge made of a polyether foam cannot be used as an on-board speaker of the type provided on the rear tray, which can be easily irradiated with direct rays of the sun.

SUMMARY OF THE INVENTION

It is therefore an object of the present invention to provide a flexible foam which exhibits an improved compatibility and considerably improved resistance to wet heat aging and resistance to ozone deterioration by using a specific polyester polyol compatible with a polyether polyol even in an amount of not more than 50% by weight and a speaker edge comprising such a flexible foam.

It is another object of the present invention to provide a flexible foam which comprises a specific aromatic secondary amine compound incorporated therein to have an even better resistance to ozone deterioration and a speaker edge comprising such a flexible foam.

It is a further object of the present invention to provide a flexible foam which comprises a specific monofunctionally-terminated compound incorporated therein to have an improved waterproofness and a speaker edge comprising such a flexible foam.

These and other objects of the present invention will become more apparent from the following detailed description and examples.

The above objects of the present invention has been attained by the following means:

(1) A flexible polyurethane foam obtained by the reaction of a composition comprising a polyisocyanate and a polyol component, wherein the polyol component contains a polyether polyol and polyester polyol between ester bonds, said polyester polyol having at least one of (i) a hydrocarbon group having at least 5 carbon atoms and (ii) a group having a hydrogen atom bonded to a skeleton containing at least 5 atoms consisting of carbon atoms and hetero atoms.

(2) The flexible polyurethane foam as described in (1), wherein the proportion of the polyester polyol is not more than 50% by weight based on 100% by weight of the sum of the content of the polyester polyol and the polyether polyol.

(3) The flexible polyurethane foam as described in (1), wherein the polyol component contains a hydroxyl compound having an ether bond and an ester bond per molecule.

(4) The flexible polyurethane foam as described in (1), wherein the polyol component contains a polyester polyol having a secondary terminal hydroxyl group.

(5) The flexible polyurethane foam as described in (1), wherein the polyol component contains a polymer polyol.

(6) The flexible polyurethane foam as described in (1), wherein the composition contains an aromatic secondary amine compound in an amount of from 1 to 25 parts by weight based on 100 parts by weight of the polyol contained in the polyol component.

(7) The flexible polyurethane foam as described in (1), wherein the composition comprises a monofunctionally-terminated compound having at least one of (i) a hydrocarbon group having at least 5 carbon atoms and (ii) a group having a hydrogen atom bonded to a skeleton containing at least 5 atoms consisting of carbon atoms and hetero atoms at one end of the molecular chain or a middle portion thereof and an active group reactive with the isocyanate group contained in the polyisocyanate or an active group reactive with an active hydrogen group contained in the polyol contained in the polyol component (these active groups are bonded to the carbon atom at the end of the molecular chain or the carbon atom adjacent to the terminal carbon atom) at the other end thereof.

(8) The flexible polyurethane foam as described in (1), which is used as a speaker edge.

(9) A flexible polyurethane foam obtained by the reaction of a composition comprising a polyisocyanate and a polyol component, wherein the polyol component contains at least one of a hydroxyl compound having an ether bond and an ester bond per molecule and a polyester polyol having a secondary terminal hydroxyl group and a polyether polyol.

(10) The flexible polyurethane foam as described in (9), wherein the polyol component contains a polymer polyol.

(11) The flexible polyurethane foam as described in (9), wherein the composition contains an aromatic secondary amine compound in an amount of from 1 to 25 parts by weight based on 100 parts by weight of the polyol contained in the polyol component.

(12) The flexible polyurethane foam as described in (9), wherein the composition comprises a monofunctionally-terminated compound having at least one of (i) a hydrocarbon group having at least 5 carbon atoms and (ii) a group having a hydrogen atom bonded to a skeleton containing at least 5 atoms consisting of carbon atoms and hetero atoms at one end of the molecular chain or a middle portion thereof and an active group reactive with the isocyanate group contained in the polyisocyanate or an active group reactive with an active hydrogen group contained in the polyol contained in the polyol component (these active groups are bonded to the carbon atom at the end of the molecular chain or the carbon atom adjacent to the terminal carbon atom) at the other end thereof.

(13) The flexible polyurethane foam as described in (9), which is used as a speaker edge.

BRIEF DESCRIPTION OF THE DRAWINGS

These and other objects of the invention will be seen by reference to the description, taken in connection with the accompanying drawing, in which.

DETAILED DESCRIPTION OF THE INVENTION

Figure 1:
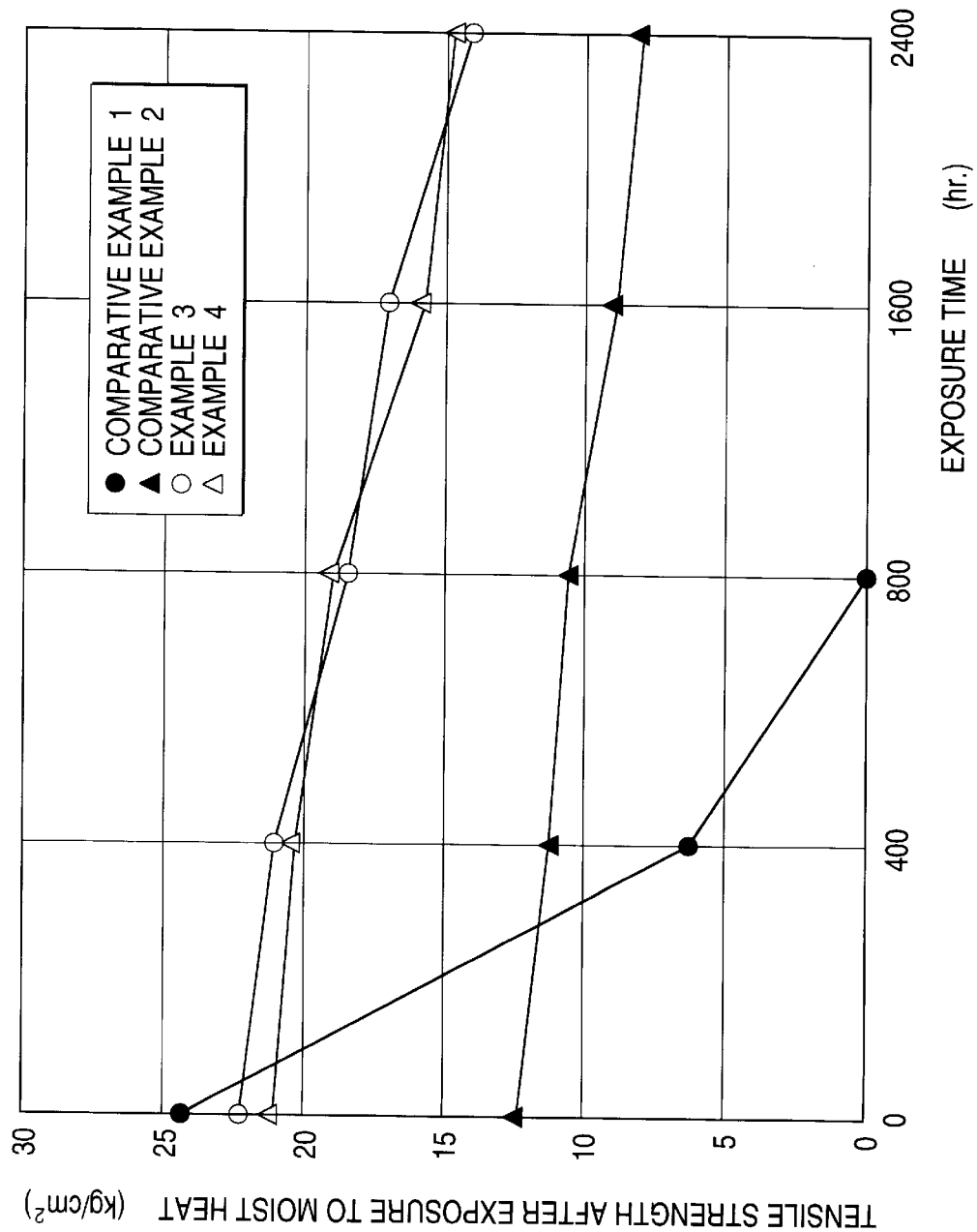
FIG. 1 graphically illustrates the resistance to wet heat aging of the flexible foams of Comparative Examples 1 and 2 and Examples 3 and 4.

The foregoing polyol component contains various polyols as well as a foaming agent, a catalyst, a foam stabilizer, etc. The foregoing "composition" may comprise an aromatic secondary amine compound defined in the above item (6) or (11) and a monofunctionally-terminated compound defined in the above item (7) or (12) incorporated therein as necessary. As the foaming agent there may be mainly used water, in combination with dichloromethane or the like for the purpose of inhibiting the generation of heat. As the catalyst there may be normally used an amine catalyst, in particular a tertiary amine and an organic tin compound such as stannous octoate, dibutyltin diacetate and dibutyltin dilaurate in combination. As the foam stabilizer there may be used a general-purpose block copolymer of dimethyl polysiloxane with a polyether or the like. The foregoing composition may further comprise an oxidation inhibitor, an ultraviolet absorbent, a light stabilizer, an electrically-conductive substance such as carbon black, a colorant, a filler, etc. incorporated therein.

As the foregoing "polyisocyanate" there may be used any polyisocyanate which is commonly used in the preparation of a flexible foam without any restriction. Examples of such a polyisocyanate include toluene diisocyanate (TDI), diphenylmethane diisocyanate (MDI), mixture of TDI and MDI, modification product of TDI and MDI and the like. Other examples of the polyisocyanate employable herein include aromatic polyisocyanates such as polymeric MDI, 1,5-naphthalene diisocyanate, trizine diisocyanate (TODI), paraphenylene diisocyanate, xylylene diisocyanate (XDI) and tetramethylxylene diisocyanate. Further, aliphatic or alicyclic polyisocyanates such as hexamethylene diisocyanate, hydrogenated XDI ($H_6XDI$), hydrogenated MDI ($H_{12}MDI$), isophorone diisocyanate, cyclohexyl diisocyanate and lysine diisocyanate (LDI) may be used.

As the polyol to be contained in the polyol component there may be used a polyester polyol (hereinafter referred to as "long-chain polyester polyol") having at least one of "(i) a hydrocarbon group having at least 5 carbon atoms" and "(ii) a group having a hydrogen atom bonded to a skeleton containing at least 5 atoms consisting of carbon atoms and hetero atoms" (hereinafter referred to as "hetero atom-containing group") between ester bonds and "polyether polyol" in combination.

The long-chain polyester polyol has an excellent compatibility with a polyether polyol as compared with the conventional polyester polyol having a short-chain hydrocarbon group. Even if the content of such a long-chain polyester polyol falls below 50% by weight of the total weight of the polyol, the reaction proceeds without any problem to obtain a flexible foam having a good quality. The skeleton constituting the foregoing hydrocarbon group and hetero atom-containing group may be straight-chain or branched. The number of carbon atoms contained in all the hydrocarbon groups between the ester bonds and sum of the number of carbon atoms and hetero atoms contained in the hetero atom-containing group each do not have to be at least 5. If the number of these long-chain groups is preferably at least ⅓, more preferably at least ½ of the total number of hydrocarbon groups and hetero atom-containing groups between ester bonds, a long-chain polyester polyol can be obtained which exhibits an excellent compatibility with a polyether polyol particularly during the foaming reaction procedure.

The mixing proportion of the long-chain polyester polyol is preferably not more than 50% by weight as defined in the above item (2) from the standpoint of resistance to resistance to wet heat aging. If the mixing proportion of the long-chain polyester polyol falls below 50% by weight, a flexible foam having the same or better resistance to wet heat aging than the polyether foam can be obtained.

The long-chain polyester polyol can be obtained by the condensation reaction of a polyvalent alcohol having a hydrocarbon group having at least 5 carbon atoms (hereinafter referred to as "long-chain polyvalent alcohol") with a dibasic acid having a hydrocarbon group having not more than 4 carbon atoms (hereinafter referred to as "short-chain dibasic acid"). The long-chain polyester polyol can also be obtained by the condensation reaction of a polyvalent alcohol having a hydrocarbon group having not more than 4 carbon atoms (hereinafter referred to as "short-chain polyvalent alcohol") with a dibasic acid having a hydrocarbon group having at least 5 carbon atoms (hereinafter referred to as "long-chain dibasic acid"). Alternatively, the long-chain polyester polyol can be obtained by the reaction of a long-chain polyvalent alcohol with a long-chain dibasic acid. In this case, a long-chain polyester polyol having a better compatibility with a polyether polyol can be obtained. Alternatively, the long-chain polyester polyol can be produced by the ring-opening polymerization of a cyclic compound having a hydrocarbon group having at least 5 carbon atoms. A polycarbonate polyol obtained from a long-chain polyvalent alcohol, too, can be used as a long-chain polyester polyol.

Examples of the long-chain polyvalent alcohol employable herein include methylpentanediol (6 carbon atoms), pentanediol (5 carbon atoms), trimethylolpropane (6 carbon atoms), hexanediol (6 carbon atoms), neopentyl glycol (5 carbon atoms), trimethylhexanediol (9 carbon atoms), 3-methyl-1,5-pentanediol (6 carbon atoms), 1,9-nonanediol (9 carbon atoms), methyl-1,8-octanediol (9 carbon atoms), cyclohexanedimethanol (6 carbon atoms) and the like. Further, a polytetramethyleneether glycol (PTMG), a dimer diol (36 carbon atoms), a castor oil comprising ricinoleate of glycerin as a main component (18×3+3 carbon atoms), etc. may be used.

As the long-chain dibasic acid there may be used an aliphatic dibasic acid such as azelaic acid (7 carbon atoms), sebacic acid (8 carbon atoms) and dodecanedioic acid (10 carbon atoms). Further, an aromatic dibasic acid such as phthalic acid, isophthalic acid and terephthalic acid (all these dibasic acids have 6 carbon atoms), an alicyclic dibasic acid such as cyclohexanedicarboxylic acid (6 carbon atoms) or the foregoing dimeric acid may be used. The long-chain polyester polyol can be produced by the dehydro-condensation of at least one of these long-chain polyvalent alcohols and at least one of these long-chain dibasic acids. Further, the long-chain polyester polyol can be obtained by adding short-chain polyvalent alcohols or short-chain dibasic acids to either of the long-chain polyvalent alcohol and the long-chain dibasic acid or both of them. The long-chain polyester polyol can also be obtained by the ring-opening polymerization of a cyclic compound having a hydrocarbon group having at least 5 carbon atoms such as lactone (e.g., methylvalerolactone (5 carbon atoms), caprolactone (5 carbon atoms)).

The foregoing dimer diol is mainly an aliphatic or alicyclic diol having 36 carbon atoms obtained by the hydrogenation of a dimeric acid produced by the thermal polymerization of an unsaturated aliphatic acid having 18 carbon atoms such as vegetable aliphatic acid obtained by the purification of drying oil, semidrying oil or the like. The use of an alcohol or acid having a very large number of carbon atoms such as dimer diol and dimeric acid particularly advantageously makes it possible to obtain a long-chain polyester polyol having a better compatibility with a polyether polyol. The dimer diol and dimeric acid may be used in combination with other long-chain or short-chain polyvalent alcohols or dibasic acids. In this case, if the amount of the dimer diol and dimeric acid to be used is preferably at least 10% by weight of the total weight of the polyvalent alcohol or dibasic acid, a long-chain polyester polyol having a sufficient compatibility can be used.

Alternatively, the long-chain polyester polyol can be prepared from a long-chain polyvalent alcohol or long-chain dibasic acid having a hetero atom-containing group. Examples of hetero atoms to be contained in the hetero atom-containing group include O, S, N and the like. The hetero atom-containing group can be formed by diethylene glycol, dipropylene glycol, etc. If diethylene glycol is used, a long-chain polyester polyol having —$CH_2$—$CH_2$—O—$CH_2$—$CH_2$— group (total number of carbon atoms and oxygen atoms: 5) between ester bonds can be obtained.

A long-chain polyester polyol obtained from a bifunctional alcohol has an enhanced elongation but has no improvement in hardness. On the other hand, a long-chain polyester polyol obtained from a trifunctional alcohol such as trimethylol propane has improvements in both elongation and hardness. Thus, long-chain polyester polyols obtained from bifunctional to tetrafunctional polyvalent alcohols are suitable for the preparation of flexible foams, though showing some difference in function. Accordingly, the functionality of the polyvalent alcohol to be used may be properly selected depending on the desired properties of the foam. If a pentavalent or higher polyvalent alcohol is used, the resulting foam is too hard. Therefore, such a multifunctional polyvalent alcohol is not suitable for the preparation of a flexible foam.

The molecular weight of such a polyvalent alcohol per functionality is preferably from about 400 to about 2,000. Further, the molecular weight of the long-chain polyester polyol thus obtained is preferably from 800 to 6,000. The hydroxyl number of the long-chain polyester polyol is preferably from about 40 to about 120 mgKOH/g. If the molecular weight of the long-chain polyester polyol is less than 800 (hydroxyl number is more than 120 mgKOH/g), the crosslink density during the production of foam is so high as to give a hard foam. On the contrary, if the molecular weight of the long-chain polyester polyol is more than 6,000 (hydroxyl number is less than 40 mgKOH/g), the long-chain polyester polyol has too high a viscosity to handle.

In the present invention, as the polyester polyol there may be used a polyester polyol having a hydrocarbon group having not more than 4 carbon atoms between ester bonds in combination with the foregoing long-chain polyester polyol. As such a polyester polyol having a short-chain hydroxyl group there may be normally used a polyester polyol which is used in the preparation of a flexible foam. This short-chain polyester polyol can be used in such an amount that the good compatibility of the polyester polyol with the polyether polyol is not impaired. The proportion of the short-chain polyester polyol is preferably not more than 70% by weight based on 100% by weight of the sum of the amount of the long-chain polyester polyol and the short-chain polyester polyol.

As the short-chain polyester polyol there may be used one obtained by the condensation reaction of the following polyvalent alcohol and dibasic acid. Examples of the polyvalent alcohol employable herein include divalent alcohols such as ethylene glycol, propylene glycol, 1,4-butanediol and 1,3-butanediol. Examples of the dibasic acid employable herein include succinic acid, glutaric acid, adipic acid, maleic acid, fumaric acid and the like.

As the foregoing "polyether polyol" to be used in combination with the long-chain polyester polyol there may be used one obtained by random or block addition polymerization of a starting material having at least two active hydrogen atoms with an alkylene oxide. Examples of the starting material employable herein include polyvalent alcohols such as propylene glycol, dipropylene glycol, glycerin, trimethylol propane and pentaerythritol, and amines such as ethylenediamine and tolylenediamine. Further, the foregoing PTMG, which has an ether bond, or the like may be used. Moreover, the modification products of the foregoing various polyols may be used. Examples of the alkylene oxide employable herein include ethylene oxide, propylene oxide, trimethylene oxide, butylene oxide, styrene oxide, α-methyltrimethylene oxide, and 3,3'-dimethyltrimethylene oxide.

The long-chain polyester polyol has a sufficient compatibility with the polyether polyol particularly during the foaming reaction procedure. In order to further enhance the compatibility of the long-chain polyester polyol with the polyether polyol, a "hydroxyl compound having an ether bond and an ester bond per molecule" may be used in combination with the long-chain polyester polyol as defined in the above item (3). A representative examples of such a polyol is a polyester-polyether polyol. Further, a polyol which has an ester group incorporated in its molecule by the reaction with an isocyanate or an urethane-modified polyol such as composition prepared from a prepolymer terminated by hydroxyl group or isocyanate group may be used. The hydroxyl compound having an ether bond and an ester bond per molecule has a polyester moiety and a polyether moiety in its molecule. These moieties act like a compatibilizer to further enhance the compatibility of the long-chain polyester polyol with the polyether polyol.

In the present invention, the compatibility of the long-chain polyester polyol with the polyether polyol can be enhanced by the additional use of a polyester polyol having a secondary terminal hydroxyl group as defined in the above item (4). Examples of the "polyester polyol having a secondary terminal hydroxyl group" employable herein include polyols obtained by the condensation of propylene glycol or 1,3-butanediol with adipic acid. The proportion of the hydroxyl compound having an ether bond and an ester bond per molecule and the polyester polyol having a secondary terminal hydroxyl group is preferably not more than about 30% by weight based on 100% by weight of the total weight of the polyol.

The mechanism of the enhancement of the compatibility of the long-chain polyester polyol with the polyether polyol by the use of the polyester polyol having a secondary terminal hydroxyl group is not yet made clear. This may be partly because the polyester polyol exhibits slightly lower polarity and hydrogen bond that enhance its compatibility with the polyether polyol when a short-chain alkyl group such as methyl group is connected to carbon atom adjacent to the terminal hydroxyl group or ester group than when a hydrogen atom is connected to the carbon atom. Another possible mechanism is that the resulting steric hindrance causes the drop of the reactivity of polyol close to that of polyether polyol, making it possible to effect the reaction of the ester and ether polyols at almost the same rate in each step of nucleation, bubble stability, cell growth and gelation and hence produce a polyester foam and a polyether foam in the same manner. Thus, the two foams can form a homogeneous layer or show a high dispersion in each other, possibly making it possible to form a flexible foam having a polyester foam and a polyether foam microfinely dispersed in each other.

In the above item (9), the polyol component is free of a long-chain polyester polyol which is essential in the above item (1). However, a specific polyester polyol having a better compatibility with polyether polyol than short-chain polyester polyol is additionally used in the above item (9). Accordingly, a flexible foam having both the advantages of polyester foam and polyether foam can be obtained as in the above item (1). The flexible foam can be formed into a speaker edge having a practical waterproofness.

In the present invention, a polymer polyol may be additionally used as in the above item (5) or (10) to enhance the strength and hardness of the foam thus obtained. The "polymer polyol" may be obtained by the graft polymerization of acrylonitrile, styrene or the like onto a polyether polyol or the like. In the polymer polyol, the weight ratio of styrene component to acrylonitrile component is preferably from 80/20 to 50/50.

If the solid content in the polymer polyol is low, this polyol needs to be blended in a large amount to sufficiently enhance the strength, hardness or other properties of the foam thus obtained. In this case, the mixing proportion of other polyols such as long-chain polyester polyol and polyether polyol must be reduced, resulting in insufficient enhancement of strength and elongation. Accordingly, the solid content in the polymer polyol is preferably at least 30% by weight based on 100% by weight of the polymer polyol. The proportion of the polymer polyol is preferably not more than about 30% by weight based on 100% by weight of the total weight of the polyol.

In the above item (1), the foregoing polyester-polyether polyol as well as a polyester polyol having a secondary terminal hydroxyl group, polymer polyol or the like may be additionally used besides the essential long-chain polyester polyol and polyether polyol. However, the sum of the amount of the long-chain polyester polyol and polyether polyol is preferably at least about half the total weight of the polyol.

In the above item (1), the combined use of a long-chain polyester polyol and a polyether polyol makes it possible to obtain a flexible foam provided with practical resistance to wet heat aging and resistance to ozone deterioration. Also in the above item (9), the use of a specific polyester polyol having an excellent compatibility with polyether polyol makes it possible to obtain a flexible foam having excellent properties as in the above item (1). Further, an aromatic secondary amine compound may be incorporated in the composition in a predetermined amount as defined in the above item (6) or (11) to further enhance the resistance to ozone deterioration of a flexible foam. Thus, a flexible foam having a better resistance to ozone deterioration can be obtained.

Examples of the foregoing "aromatic secondary amine compound" (hereinafter referred to as "secondary amine compound") employable herein include phenyl-1-naphthylamine, alkylated diphenylamine, N,N'-diphenyl-p-phenylenediamine, p-(p-toluenesulfonylamido)diphenylamine, 4,4'-(α,α-dimethyl benzyl)diphenylamine, mixed diallyl-p-phenylenediamine, octylated diphenylamine and the like. Further, amine-ketone compounds such as poly(2,2,4-trimethyl-1,2-dihydroquinoline) and 6-ethoxy-1,2-dihydro-2,2,4-trimethylquinoline may be used.

These secondary amine compounds are used as age resistors for rubber, etc. However, it is not known that these compounds have a function of inhibiting the ozone deterioration of polyurethane foams. The amount of these compounds, if used as a rubber age resistor or the like, is normally from several hundreds of ppm to several thousands of ppm, 5,000 ppm at most. On the other hand, these secondary amine compounds are preferably incorporated in the composition in an amount of at least 1 part by weight, more preferably at least 3 parts by weight, particularly preferably in an amount as large as at least 5 parts by weight, based on the polyol. As calculated in terms of amount based on foam, the amount of these secondary amine compounds to be incorporated is preferably at least 7,000 ppm, more preferably at least 2 parts by weight, particularly preferably at least 3.5 parts by weight. Thus, in the present invention, these secondary amine compounds are not only known for their functions and effects but also used in a large amount far more than conventional ordinary value.

The foregoing secondary amine compounds may be used, singly or in combination. If the amount of these compounds to be incorporated falls below 1 part by weight, the resulting flexible foam leaves something to be desired in the enhancement of resistance to ozone deterioration. On the contrary, if the amount of these compounds to be incorporated exceeds 25 parts by weight, the resulting composition can hardly undergo reaction and hardening, occasionally making it impossible to obtain a normal foam. The amount of these secondary amine compounds to be incorporated is particularly preferably from 1 to 10 parts by weight. If the amount of these secondary amine compounds to be incorporated falls within this range, a flexible foam having an excellent resistance to ozone deterioration can be obtained. The composition thus obtained can easily undergo reaction and hardening. The composition has no trouble in operation to advantage.

The incorporation of such a secondary amine compound makes it possible to enhance particularly the resistance to ozone deterioration as well as the weather resistance of the foam. In order to further enhance the weather resistance of the foam, an ultraviolet absorbent is preferably incorporated in the composition. Examples of the ultraviolet absorbent employable herein include various ultraviolet absorbents such as benzotriazole, benzophenone, salicylic acid and hindered amine ultraviolet absorbents. Further, specific piperidine ultraviolet absorbents may be used. The amount of such an ultraviolet absorbent to be incorporated is preferably from 0.1 to 3% by weight, particularly from 0.5 to 1.5% by weight based on 100% by weight of the polyol. The secondary amine compound and the ultraviolet absorbent may be previously incorporated in the polyol component or polyisocyanate or may be incorporated in the composition at the same time with the incorporation of the polyol component and polyisocyanate.

As defined in the above item (7) or (12), the flexible foam of the present invention may be prepared from a composition comprising a monofunctionally-terminated compound having at least one of a hydrocarbon group having at least 5 carbon atoms and a group having a hydrogen atom bonded to a skeleton containing at least 5 atoms consisting of carbon atoms and hetero atoms at one end of the molecular chain or a middle portion thereof and an active group reactive with the isocyanate group contained in the polyisocyanate or an active group reactive with an active hydrogen group contained in the polyol contained in the polyol component (these active groups are bonded to the carbon atom at the end of the molecular chain or the carbon atom adjacent to the terminal carbon atom) at the other end thereof. In this manner, a flexible foam having a better waterproofness can be obtained.

The hydrocarbon group and hetero atom-containing group contained in the foregoing "monofunctionally-terminated compound" may be straight-chain or branched saturated or unsaturated groups. Further, the hydrocarbon group and hetero atom-containing group may be aliphatic groups, aromatic groups or alicyclic groups or may contain these groups. The monofunctionally-terminated compound may comprise one of these various hydrocarbon groups and hetero atom-containing groups or may comprise a compound of monofunctionally-terminated compounds having at least two hydrocarbon groups and hetero atom-containing groups.

The number of carbon atoms or the number of hetero atoms in the hydrocarbon group and the hetero atom-containing group is preferably from 6 to 48, particularly from 8 to 36. They may be properly selected taking into account the required waterproofness, handleability, etc. Further, as the monofunctionally-terminated compound there may be used various compounds having the foregoing "one active group reactive with the isocyanate group or active hydrogen group", singly or in combination.

The foregoing term "monofunctionally-terminated compound" as used herein is meant to indicate that the foregoing active group is bonded to a compound having a plurality of molecule terminals at only one of these terminals. The middle portion of the monofunctionally-terminated compound, except for the end thereof, is composed of a hydrocarbon group or a group containing hetero atoms such as —NH—, —O—, —S—, —CO— and —N(R)— (in which R is an alkyl group).

As the monofunctionally-terminated compound there may be used a monoisocyanate such as octadecyl isocyanate and monoisocyanate derived from a mixture of hexadecylamine and octadecylamine. Further, a monoalcohol such as 1-octanol, 1-decanol, lauryl alcohol, oleyl alcohol, other branched higher alcohols and monoalcohol terminated by —O—, —S— or the like (e.g., $ROCH_2$—$CH_2OH$) may be used. Moreover, octylamine, laurylamine, octadecylamine and monoamine terminated by —O—, —S— or the like may be exemplified. A silicone foam stabilizer terminated by hydroxyl group may be used as the monofunctionally-terminated compound as well.

The amount of the monofunctionally-terminated compound to be incorporated is preferably from 0.1 to 35 parts by weight, more preferably from 0.1 to 25 parts by weight, particularly preferably from 0.3 to 10 parts by weight based on 100 parts by weight of the sum of the amount of polyisocyanate and polyol. The amount of the monofunctionally-terminated compound to be incorporated should be determined by the required waterproofness taking into account the number of carbon atoms in the hydrocarbon group contained in the monofunctionally-terminated compound to be incorporated, the kind of functional group, the difference in reactivity from the polyisocyanate and polyol which are main components, and other factors. If the amount of the monofunctionally-terminated compound to be incorporated falls below 0.1 parts by weight, a sufficient waterproofness cannot be obtained. On the contrary, if the amount of the monofunctionally-terminated compound to be incorporated exceeds 35 parts by weight, foaming is difficult in itself. Further, the resulting foam cannot be provided with desired physical or other properties which are originally possessed by flexible foams.

The incorporation of the monofunctionally-terminated compound can provide a flexible foam having a sufficiently excellent waterproofness. In order to further enhance the waterproofness of the flexible foam, the main component such as polyisocyanate and polyol should be hydrophobic rather than hydrophilic. Further, the foam should have as large surface area as possible to have a higher waterproofness. Accordingly, the foam cell is preferably as small as possible. The number of cells is preferably at least 50/25 mm, more preferably at least 55/25 mm, particularly preferably at least 60125 mm. If the number of cells falls below 50/25 mm, a stable waterproofness cannot be occasionally obtained.

In the monofunctionally-terminated compound, the monoalcohol, monoamine, etc. may be previously incorporated in the polyol component, and the monoisocyanate may be previously incorporated in the polyisocyanate. Alternatively, the monoalcohol, monoamine and monoisocyanate may be incorporated in the composition at the same time with the incorporation of the polyol component and polyisocyanate. Further, the monofunctionally-terminated compound has a lower reactivity than polyol, polyisocyanate, etc. Accordingly, the monofunctionally-terminated compound never inhibits the formation of foam even if added after the beginning of the reaction of production of urethane.

The speaker edge defined in the above item (8) or (13) is made of a flexible foam according to any one of the above items (1) to (7) and (9) to (12).

If a speaker comprising a speaker edge made of a flexible foam is provided inside the door trim in an automobile, the entrance of water content such as water rain into the interior of the door causes troubles as previously mentioned. The standard of waterproofness required for the flexible foam constituting the speaker edge used in the on-board speaker is that no water leakage and water penetration occurs at a hydraulic pressure of 30 mm for 12 hours. In order to meet the requirements, the percent water absorption as determined by the method described later may be preferably not more than 10% at a percent compressibility of 50% or not more than 2% at a percent compressibility of 80%. Further, the air permeability of the flexible foam (thickness: 10 mm) as determined by JIS L1096 (A method) before compression molding may be preferably from 0.5 to 10 $cc/cm^2$·second. The air permeability of the compression-molded foam as determined by JIS P8117 may be preferably at least 20 seconds.

If the percent water absorption of the flexible foam exceeds the upper limit at the respective percent compressibility, the resulting flexible foam has an insufficient waterproofness and thus cannot be used as an edge material for speakers to be provided inside the door trim in an automobile. The temperature at which the flexible foam is compression-molded is considerably high from the standpoint of the heat resistance of the foam. Therefore, the flexible foam must be rapidly compression-molded. If the air permeability of the flexible foam is too low when the flexible foam is compression-molded at a high rate, the air in the foam exerts a cushioning effect that makes it difficult to mold the flexible foam. The resulting speaker edge can be deformed. If the air permeability of the flexible foam is too high, a sufficiently low air permeability cannot be obtained even when the flexible foam is molded at a compression as high as more than the practical range. The resulting edge material leaves something to be desired in waterproofness.

The flexible foam of the present invention is free of the disadvantages of the polyester foam and polyether foam but is provided with the advantages of both the two types of foams. For example, a flexible foam provided with excellent mechanical properties and resistance to ozone deterioration characteristic of polyester foam and excellent resistance to wet heat-aging characteristic of polyether foam in combination can be obtained. Further, since the polyol to be used has a good compatibility, a flexible foam having a relatively low air permeability can be obtained without removing cell membranes more than required. Thus, a flexible foam having excellent resistance to wet heat aging and resistance to ozone deterioration and a very high durability can be obtained. The flexible foam thus obtained can form a speaker edge having excellent properties in particular.

The present invention will be further described in the following examples, but the present invention should not be construed as being limited thereto.

Flexible slab foams were prepared from the compositions comprising polyisocyanates, polyols, catalysts, foam stabilizers, etc. set forth in Tables 1 and 2 (comparative examples) and Tables 3 to 11 (examples) in accordance with an ordinary method. The details of the various components will be described later. The polyether polyols used in Examples 25 and 27 are included in polyester-polyether polyol (trade name: "3P56B") and polymer polyol (trade name: "CP3943") described later. The polyether polyols used in Examples 29, 31, 33, 47, 49 and 51 are included in polymer polyol (trade name: "CP3943") described later.

(1) Polyol a) Trade name "N2200" (available from Nippon Polyurethane Co., Ltd.): polyester polyol obtained by the condensation of diethylene glycol (DEG) and trimethylol propane with adipic acid (hydroxyl number (OHV): 60)

b) Trade name "GP3000" (available from Sanyo Chemical Industries, Ltd.): propylene oxide-based trifunctional polyether polyol prepared from glycerin as a starting substance (OHV: 56)

c) Trade name "GP2000" (available from Sanyo Chemical Industries, Ltd.): propylene oxide-based bifunctional polyether polyol (OHV: 56)

d) Trade name "3P56B" (available from Takeda Chemical Industries, Ltd.):75:25 (by weight) mixture of a polyester-polyether polyol obtained by the addition of phthalic acid and propylene glycol to "PPG1500" (trade name of a polyether polyol available from Takeda Chemical Industries, Ltd.) and "PPG3000" (trade name of a polyether polyol available from Takeda Chemical Industries, Ltd.) (OHV: 56)

e) Trade name "Kurapol P2010" (available-from Kuraray Co., Ltd.): polyester polyol obtained by the condensation of methylpentanediol with adipic acid (OHV: 56)

f) Trade name "Kurapol F3010" (available from Kuraray Co., Ltd.): polyester polyol obtained by the condensation of methylpentanediol and trimethylol propane with adipic acid (OHV: 56)

g) Trade name "Kurapol L2010" (available from Kuraray Co., Ltd.): polyester polyol obtained by the ring-opening polymerization of methyl valerolactone (OHV: 56)

h) Trade name "Newpol F1212-29" (available from Asahi Denka Kogyo K. K.): polyester polyol obtained by the condensation of hexanediol with adipic acid and isophthalic acid (OHV: 65)

i) Trade name "TA22-221" (available from Hitachi Kasei Polymer Co., Ltd.): polyester polyol obtained by the condensation of hexanediol and neopentyl glycol with adipic acid (OHV: 40)

j) Trade name "Placcel 220" (available from Daicel Chemical Industries, Ltd.): polyester polyol obtained by the ring-opening polymerization of caprolactone (OHV: 56)

k) Trade name "CP3943" (available from Dow Mitsubishi Chemical Limited): polymer polyol made of 70% by weight of styrene component and 30% by weight of acrylonitrile (solid content: 42% by weight; OHV: 28)

l) Trade name "Teslac 2458" (available from Hitachi Kasei Polymer Co., Ltd.): polyester polyol obtained by the condensation of DEG with a dimeric acid (OHV: 70)

m) Trade name "New Ace F7-67" (Asahi Denka Kogyo K. K.): polyester polyol obtained by the condensation of propylene glycol with adipic acid (OHV: 56)

n) Trade name "TA22-248C" (available from Hitachi Kasei Polymer Co., Ltd.): polyester polyol obtained by the condensation of 1,3-butanediol with adipic acid (OHV: 112)

(2) Polyisocyanate: trade name "TDI80" (available from Nippon Polyurethane Industry Co., Ltd.)

(3) Catalyst: amine catalyst available from Nippon Nyukazai Co., Ltd.)(trade name "LV33"); metallic catalyst (stannous octoate (SO)) available from Johoku Chemical Co., Ltd.)

(4) Foam stabilizer: Trade name "L532", "L520" and "SZ1919" (available from Nippon Unicar Company Limited)

(5) Secondary amine compound: "Nocrac CD" (trade name of 4,4'-($\alpha,\alpha$-dimethylbenzyl)diphenylamine available from Ouchi Shinko Chemical Corp.)

(6) Ultraviolet absorbent: "Sanole LS-744" (trade name of 4-benzoyloxy-2,2,6,6-tetramethylpiperidine available from Sankyo Co., Ltd.)

Specimens were cut out of the flexible foams. These specimens were then measured for density (kg/m$^3$) and 25% hardness (g/cm$^2$) in accordance with JIS K6401 and number of cells (/25 mm) in accordance with JIS K6402. These specimens were also evaluated for tensile strength (kg/cm$^2$) and elongation (%) in accordance with JIS K6301. These specimens were further measured for air permeability (cc/cm$^2$·sec.) in accordance with JIS L1096 (A method) and air permeability (sec.) after compression molding in accordance with JIS P8117 (A method). For the evaluation of water absorption and impermeability to water from which waterproofness is evaluated, resistance to wet heat aging, resistance to ozone deterioration and weather resistance, the following methods were used.

Percent water absorption:

A 50×50×20 mm (thickness) foam is vertically compressed at a compressibility of 50% or 80%. The specimen thus compressed is then dipped in 23° C. water 10 cm under the water surface for 24 hours. The increase in the weight of the specimen is then measured. The weight increase is represented as percentage to the volume of the specimen compressed at a compressibility of 50% and 80% as reference. % Water absorption=[{Weight change (g) between before and after dipping/Volume of specimen compressed at 50% or 80% compressibility (cm$^3$)}×100]

Impermeability to water (time):

An acrylic resin cylinder having an inner diameter of 30 mm is placed horizontally. A flexible foam which has been compression-molded at a compression factor of 14 is then put on the upper end of the cylinder. Another acrylic resin cylinder having an inner diameter of 30 mm is then put on the upper surface of the foam coaxially with the lower cylinder. Water is then supplied into the upper cylinder to a depth of 30 mm. The flexible foam is then visually observed for the occurrence of leakage and penetration of water. The standard of the impermeability to water is that the leakage of water from the interface of the upper surface of the flexible foam with the lower end surface of the upper cylinder and the penetration of water through the foam do not occur for 12 hours.

Resistance to wet heat aging:

The specimen is exposed to an atmosphere which has been conditioned to a temperature of 80° C. and a relative humidity of 95% for 400 hours, 800 hours, 1,600 hours and 2,400 hours, and then measured for tensile strength in accordance with JIS K6301.

Resistance to ozone deterioration:

The specimen is exposed to ozone for 200 hours, 400 hours, 600 hours and 800 hours in accordance with ozone deterioration test of JIS K6301, and then measured for tensile strength in accordance with JIS K6301.

Weather resistance:

Using an ultraviolet ray long-life fademeter (Type FAL-31, available from Suga Test Instruments Co., Ltd.), the specimen is exposed to ultraviolet rays at a black panel temperature of 63° C. for 100 hours, 200 hours, 300 hours and 400 hours, and then measured for tensile strength in accordance with JIS K6301.

The results of the foregoing evaluation are set forth in Tables 1 to 11 below.

TABLE 1

| | Comparative Example | | | | |
|---|---|---|---|---|---|
| | 1 | 2 | 3 | 4 | 5 |
| N2200 | 100 | | | | |
| GP3000 | | 100 | 50 | 75 | 50 |
| GP2000 | | | 50 | | |
| 3P56B | | | | 25 | 50 |
| TDI80 | 43.4 | 43.4 | 43.4 | 43.4 | 43.4 |
| Index | 115 | 115 | 115 | 115 | 115 |
| LV33 | 0.30 | 0.30 | 0.30 | 0.30 | 0.30 |
| Water | 3.00 | 3.00 | 3.00 | 3.00 | 3.00 |

TABLE 1-continued

|  | Comparative Example | | | | |
|---|---|---|---|---|---|
|  | 1 | 2 | 3 | 4 | 5 |
| Silicone |  |  |  |  |  |
| L532 | 1.50 |  |  |  |  |
| L520 |  | 1.20 | 1.20 | 1.20 | 1.20 |
| Stannous octoate | 0.10 | 0.30 | 0.30 | 0.30 | 0.30 |
| Physical properties of foam |  |  |  |  |  |
| Density | 36.5 | 35.9 | 35.6 | 35.0 | 34.6 |
| 25% Hardness | 23.5 | 14.5 | 11.5 | 13.5 | 12.5 |
| Number of cells | 50 | 35 | 36 | 40 | 44 |
| Tensile strength | 1.55 | 0.85 | 0.95 | 0.90 | 0.95 |
| Elongation | 250 | 130 | 180 | 120 | 140 |
| Air permeability (JIS L1096) | 8.3 | 121.0 | 121.0 | 72.3 | 48.5 |
| % Water absorption at 50% compression | 32.1 | 33.5 |  | 31.2 | 32.6 |
| % Water absorption at 85% compression | 14.2 | 13.5 |  | 15.2 | 13.2 |
| Physical properties of product compressed at a factor of 14 |  |  |  |  |  |
| Tensile strength | 24.56 | 12.35 | 11.56 | 12.35 | 11.35 |
| Elongation | 280 | 80 | 120 | 100 | 120 |
| Air permeability (JIS P8117) | 17.5 | 3≧ | 3≧ | 3≧ | 3≧ |
| Impermeability to water | 0.5 | 0.5≧ |  |  | 0.5≧ |
| Exposure to wet heat (80° C., 95%) |  |  |  |  |  |
| 400 hr. | 6.14 | 11.73 |  |  | 10.78 |
| 800 hr. | 0 | 10.50 | — | — | 9.65 |
| 1,600 hr. |  | 9.26 |  |  | 8.51 |
| 2,400 hr. |  | 8.65 |  |  | 7.95 |
| Exposure to ozone |  |  |  |  |  |
| 200 hr. | 18.42 | 4.32 |  |  | 7.60 |
| 400 hr. | 11.05 | 0 | — | — | 4.20 |
| 600 hr. | 6.14 |  |  |  | 3.41 |
| 800 hr. | 0 |  |  |  | 1.70 |
| Exposure to ultra violet rays (63° C.) |  |  |  |  |  |
| 100 hr. | 13.51 | 4.32 |  |  | 4.31 |
| 200 hr. | 6.14 | 0 | — | — | 0 |
| 300 hr. | 0 |  |  |  |  |
| 400 hr. |  |  |  |  |  |

TABLE 2

|  | Comparative Example | | | |
|---|---|---|---|---|
|  | 6 | 7 | 8 | 9 |
| GP3000 | 25 |  | 50 | 25 |
| 3P56B | 75 | 100 | 50 | 75 |
| TDI80 | 43.4 | 43.4 | 47.2 | 47.2 |
| Index | 115 | 115 | 125 | 125 |
| LV33 | 0.30 | 0.30 | 0.30 | 0.30 |
| Water | 3.00 | 3.00 | 3.00 | 3.00 |
| Silicone L520 | 1.20 | 1.20 | 1.20 | 1.20 |
| Stannous octoate | 0.30 | 0.30 | 0.30 | 0.30 |
| Physical properties of foam |  |  |  |  |
| Density | 35.5 | 35.8 | 35.1 | 35.0 |
| 25% Hardness | 11.5 | 10.5 | 13.5 | 12.5 |
| Number of cells | 48 | 53 | 46 | 46 |
| Tensile strength | 1.10 | 1.20 | 1.33 | 1.36 |
| Elongation | 160 | 170 | 120 | 140 |
| Air permeability (JIS L1096) | 43.5 | 28.3 | 160.0 | 165.0 |
| % Water absorption at 50% compression | 28.5 | 24.9 | 27.8 | 28.7 |
| % Water absorption at 85% compression | 13.5 | 12.6 | 13.6 | 14.6 |
| Physical properties of product compressed at a factor of 14 |  |  |  |  |
| Tensile strength | 13.12 | 10.35 | 13.85 | 12.46 |
| Elongation | 160 | 180 | 120 | 140 |
| Air permeability (JIS P8117) | 3≧ | 3≧ | 3≧ | 3≧ |
| Impermeability to water |  | 0.5≧ |  |  |
| Exposure to wet heat (80° C., 95%) |  |  |  |  |
| 400 hr. |  | 9.83 |  |  |
| 800 hr. | — | 8.80 | — | — |
| 1,600 hr. |  | 7.76 |  |  |
| 2,400 hr. |  | 7.25 |  |  |
| Exposure to ozone |  |  |  |  |
| 200 hr. |  | 6.93 |  |  |
| 400 hr. | — | 3.83 | — | — |
| 600 hr. |  | 3.11 |  |  |
| 800 hr. |  | 1.55 |  |  |
| Exposure to ultra violet rays (63° C.) |  |  |  |  |
| 100 hr. |  | 4.14 |  |  |
| 200 hr. | — | 0 | — | — |
| 300 hr. |  |  |  |  |
| 400 hr. |  |  |  |  |

TABLE 3

| | Example | | | | | |
|---|---|---|---|---|---|---|
| | 1 | 2 | 3 | 4 | 5 | 6 |
| GP3000 | 50 | 75 | 50 | 75 | 50 | 75 |
| Kurapol P2010 | 50 | 25 | | | | |
| Kurapol F3010 | | | 50 | 25 | | |
| Kurapol L2010 | | | | | 50 | 25 |
| TDI80 | 41.5 | 41.5 | 41.5 | 41.5 | 41.5 | 41.5 |
| Index | 110 | 110 | 110 | 110 | 110 | 110 |
| LV33 | 0.30 | 0.30 | 0.30 | 0.30 | 0.30 | 0.30 |
| Water | 3.00 | 3.00 | 3.00 | 3.00 | 3.00 | 3.00 |
| Silicone L520 | 1.20 | 1.20 | 1.20 | 1.20 | 1.20 | 1.20 |
| Stannous octoate | 0.30 | 0.30 | 0.30 | 0.30 | 0.30 | 0.30 |
| Physical properties of foam | | | | | | |
| Density | 34.5 | 35.6 | 35.6 | 35.0 | 34.6 | 35.5 |
| 25% Hardness | 19.5 | 17.5 | 20.5 | 16.5 | 17.5 | 15.7 |
| Number of cells | 55 | 54 | 56 | 55 | 53 | 50 |
| Tensile strength | 1.55 | 1.25 | 1.82 | 1.65 | 1.35 | 1.25 |
| Elongation | 250 | 180 | 180 | 140 | 180 | 180 |
| Air permeability (JIS L1096) | 3.2 | 9.5 | 3.0 | 6.5 | 6.1 | 5.6 |
| % Water absorption at 50% compression | 28.6 | 28.5 | 24.6 | 28.7 | 28.7 | 28.6 |
| % Water absorption at 85% compression | 13.2 | 13.0 | 12.5 | 12.1 | 13.0 | 13.0 |
| Physical properties of product compressed at a factor of 14 | | | | | | |
| Tensile strength | 19.55 | 17.65 | 22.65 | 21.55 | 15.30 | 14.55 |
| Elongation | 180 | 160 | 220 | 210 | 180 | 160 |
| Air permeability (JIS P8117) | 150.5 | 3.5 | 135.0 | 36.0 | 43.0 | 65.0 |
| Impermeability to water | 2≧ | 0.5≧ | | | 0.5 | |
| Exposure to wet heat (80° C., 95%) | | | | | | |
| 400 hr. | 17.12 | 17.12 | 21.06 | 20.47 | 14.69 | 13.68 |
| 800 hr. | 15.71 | 15.71 | 18.57 | 18.75 | 12.62 | 12.37 |
| 1,600 hr. | 14.12 | 14.12 | 16.76 | 16.16 | 11.63 | 10.19 |
| 2,400 hr. | 13.59 | 13.59 | 14.04 | 14.55 | 9.95 | 9.46 |
| Exposure to ozone | | | | | | |
| 200 hr. | 12.00 | 12.00 | 15.86 | 14.87 | 11.48 | 9.46 |
| 400 hr. | 7.24 | 7.24 | 9.74 | 9.16 | 7.04 | 5.82 |
| 600 hr. | 4.41 | 4.41 | 6.12 | 4.96 | 3.83 | 2.91 |
| 800 hr. | 1.94 | 1.94 | 2.27 | 1.94 | 1.30 | 1.46 |
| Exposure to ultraviolet rays (63° C.) | | | | | | |
| 100 hr. | 6.53 | 6.53 | 8.83 | 8.30 | 6.12 | 5.09 |
| 200 hr. | 0 | 0 | 0 | 0 | 0 | 0 |
| 300 hr. | | | | | | |
| 400 hr. | | | | | | |

TABLE 4

| | Example | | | | | |
|---|---|---|---|---|---|---|
| | 7 | 8 | 9 | 10 | 11 | 12 |
| GP3000 | 50 | 75 | 50 | 75 | 50 | 75 |
| New Pole F1212-29 | | | 50 | 25 | | |
| TA22-221 | | | | | 50 | 25 |
| Placcel 220 | 50 | 25 | | | | |
| TDI80 | 41.5 | 41.5 | 41.9 | 41.9 | 40.1 | 40.8 |
| Index | 110 | 110 | 110 | 110 | 110 | 110 |
| LV33 | 0.30 | 0.30 | 0.30 | 0.30 | 0.30 | 0.30 |
| Water | 3.00 | 3.00 | 3.00 | 3.00 | 3.00 | 3.00 |

TABLE 4-continued

|  | Example | | | | | |
|---|---|---|---|---|---|---|
|  | 7 | 8 | 9 | 10 | 11 | 12 |
| Silicone L520 | 1.20 | 1.20 | 1.20 | 1.20 | 1.20 | 1.20 |
| Stannous octoate | 0.30 | 0.30 | 0.30 | 0.30 | 0.30 | 0.30 |
| Physical properties of foam | | | | | | |
| Density | 35.8 | 35.1 | 35.0 | 36.5 | 35.9 | 35.6 |
| 25% Hardness | 16.8 | 15.4 | 17.6 | 19.5 | 18.9 | 16.3 |
| Number of cells | 58 | 56 | 56 | 56 | 55 | 36 |
| Tensile strength | 1.85 | 1.45 | 1.75 | 1.76 | 2.15 | 1.73 |
| Elongation | 190 | 150 | 170 | 200 | 200 | 190 |
| Air permeability (JIS L1096) | 4.5 | 4.6 | 3.2 | 1.3 | 2.6 | 1.8 |
| % Water absorption at 50% compression | 28.6 | 27.3 | 28.5 | 26.5 | 27.5 | 27.2 |
| % Water absorption at 85% compression | 10.5 | 15.1 | 13.5 | 13.1 | 14.2 | 13.6 |
| Physical properties of product compressed at a factor of 14 | | | | | | |
| Tensile strength | 23.56 | 22.34 | 19.56 | 19.45 | 22.35 | 18.46 |
| Elongation | 230 | 190 | 230 | 260 | 200 | 180 |
| Air permeability (JIS P8117) | 73.5 | 69.0 | 180.5 | 360.5 | 245.5 | 300.0 |
| Impermeability to water |  |  | 2 | 3 | 3 | 3 |
| Exposure to wet heat (80° C., 95%) | | | | | | |
| 400 hr. | 22.38 | 21.67 | 18.78 | 18.48 | 21.46 | 17.35 |
| 800 hr. | 20.03 | 19.88 | 16.14 | 16.92 | 18.44 | 15.69 |
| 1,600 hr. | 17.67 | 17.87 | 14.87 | 14.59 | 16.99 | 12.92 |
| 2,400 hr. | 16.49 | 17.20 | 12.71 | 13.13 | 14.53 | 12.00 |
| Exposure to ozone | | | | | | |
| 200 hr. | 16.73 | 15.19 | 14.67 | 13.42 | 16.76 | 12.00 |
| 400 hr. | 9.90 | 9.16 | 9.00 | 8.27 | 10.28 | 7.38 |
| 600 hr. | 6.83 | 5.59 | 4.89 | 4.47 | 5.59 | 3.69 |
| 800 hr. | 2.59 | 2.46 | 1.66 | 1.75 | 1.90 | 1.85 |
| Exposure to ultraviolet rays (63° C.) | | | | | | |
| 100 hr. | 8.72 | 8.27 | 7.82 | 7.49 | 8.94 | 6.46 |
| 200 hr. | 0 | 0 | 0 | 0 | 0 | 0 |
| 300 hr. | | | | | | |
| 400 hr. | | | | | | |

TABLE 5

|  | Example | | | | |
|---|---|---|---|---|---|
|  | 13 | 14 | 15 | 16 | 17 |
| GP3000 | 25 | 50 | 25 | 50 | 25 |
| Kurapol P2010 | 50 | 25 |  |  |  |
| Kurapol F3010 |  |  | 50 | 25 |  |
| Kurapol L2010 |  |  |  |  | 50 |
| 3P56B | 25 | 25 | 25 | 25 | 25 |
| TDI80 | 41.5 | 41.5 | 41.5 | 41.5 | 41.5 |
| Index | 110 | 110 | 110 | 110 | 110 |
| LV33 | 0.30 | 0.30 | 0.30 | 0.30 | 0.30 |
| Water | 3.00 | 3.00 | 3.00 | 3.00 | 3.00 |
| Silicone L520 | 1.20 | 1.20 | 1.20 | 1.20 | 1.20 |
| Stannous octoate | 0.30 | 0.30 | 0.30 | 0.30 | 0.30 |

TABLE 5-continued

|  | Example | | | | |
|---|---|---|---|---|---|
|  | 13 | 14 | 15 | 16 | 17 |
| Physical properties of foam | | | | | |
| Density | 34.8 | 34.6 | 35.3 | 35.1 | 35.4 |
| 25% Hardness | 18.6 | 18.0 | 21.5 | 20.5 | 17.0 |
| Number of cells | 60 | 64 | 68 | 63 | 56 |
| Tensile strength | 1.60 | 1.55 | 2.10 | 1.90 | 1.42 |
| Elongation | 260 | 230 | 230 | 210 | 180 |
| Air permeability (JIS L1096) | 5.6 | 4.6 | 1.2 | 3.5 | 3.4 |
| % Water absorption at 50% compression | 26.5 | 26.9 | 28.6 | 28.6 | 29.1 |

TABLE 5-continued

|  | Example | | | | |
|---|---|---|---|---|---|
|  | 13 | 14 | 15 | 16 | 17 |
| % Water absorption at 85% compression | 12.9 | 15.1 | 13.5 | 13.4 | 14.1 |
| Physical properties of product compressed at a factor of 14 | | | | | |
| Tensile strength | 19.55 | 17.85 | 23.34 | 21.75 | 17.55 |
| Elongation | 260 | 220 | 230 | 210 | 170 |
| Air permeability (JIS P8117) | 58.5 | 65.0 | 480.5 | 120.0 | 145.5 |
| Impermeability to water | 3 | | | | |
| Exposure to wet heat (80° C., 95%) | | | | | |
| 400 hr. | 18.57 | 17.31 | 21.71 | 20.66 | 16.85 |
| 800 hr. | 16.62 | 15.89 | 19.14 | 18.92 | 14.48 |
| 1,600 hr. | 14.66 | 14.28 | 17.27 | 16.31 | 13.34 |
| 2,400 hr. | 13.69 | 13.74 | 14.47 | 14.68 | 11.41 |
| Exposure to ozone | | | | | |
| 200 hr. | 13.88 | 12.14 | 16.34 | 15.01 | 13.16 |
| 400 hr. | 8.21 | 7.32 | 10.04 | 9.24 | 8.07 |
| 600 hr. | 5.67 | 4.46 | 6.30 | 5.00 | 4.39 |
| 800 hr. | 2.15 | 1.96 | 2.33 | 1.96 | 13.49 |
| Exposure to ultraviolet rays (63° C.) | | | | | |
| 100 hr. | 7.23 | 6.60 | 9.10 | 8.37 | 7.02 |
| 200 hr. | 0 | 0 | 0 | 0 | 0 |
| 300 hr. | | | | | |
| 400 hr. | | | | | |

TABLE 6

|  | Example | | | | |
|---|---|---|---|---|---|
|  | 18 | 19 | 20 | 21 | 22 |
| GP3000 | 50 | 25 | 50 | 25 | 50 |
| Kurapol L2010 | 25 | | | | |
| New Pole F1212-29 | | 50 | 25 | | |
| TA22-221 | | | | 50 | 25 |
| 3P56B | 25 | 25 | 25 | 25 | 25 |
| TDI80 | 41.5 | 41.9 | 41.7 | 40.1 | 40.1 |
| Index | 110 | 110 | 110 | 110 | 110 |
| LV33 | 0.30 | 0.30 | 0.30 | 0.30 | 0.30 |
| Water | 3.00 | 3.00 | 3.00 | 3.00 | 3.00 |
| Silicone L520 | 1.20 | 1.20 | 1.20 | 1.20 | 1.20 |
| Stannous octoate | 0.30 | 0.30 | 0.30 | 0.30 | 0.30 |

TABLE 6-continued

|  | Example | | | | |
|---|---|---|---|---|---|
|  | 18 | 19 | 20 | 21 | 22 |
| Physical properties of foam | | | | | |
| Density | 35.3 | 36.4 | 35.2 | 35.6 | 35.7 |
| 25% Hardness | 14.0 | 17.8 | 15.6 | 17.5 | 15.4 |
| Number of cells | 56 | 65 | 65 | 62 | 58 |
| Tensile strength | 1.25 | 1.93 | 1.76 | 1.85 | 1.82 |
| Elongation | 160 | 220 | 200 | 220 | 190 |
| Air permeability (JIS L1096) | 2.6 | 2.6 | 5.6 | 4.3 | 5.1 |
| % Water absorption at 50% compression | 25.9 | 28.7 | 29.6 | 28.1 | 28.5 |
| % Water absorption at 85% compression | 13.9 | 14.6 | 13.0 | 14.2 | 15.1 |
| Physical properties of product compressed at a factor of 14 | | | | | |
| Tensile strength | 16.55 | 22.32 | 18.65 | 21.58 | 17.32 |
| Elongation | 170 | 260 | 240 | 220 | 200 |
| Air permeability (JIS P8117) | 55.0 | 38.5 | 19.5 | 25.0 | 24.5 |
| Exposure to wet heat (80° C., 95%) | | | | | |
| 400 hr. | 15.56 | 21.43 | 17.53 | 20.50 | 16.80 |
| 800 hr. | 14.07 | 18.41 | 15.85 | 18.34 | 15.41 |
| 1,600 hr. | 11.59 | 16.96 | 13.06 | 16.19 | 13.86 |
| 2,400 hr. | 10.76 | 14.51 | 12.12 | 15.11 | 13.34 |
| Exposure to ozone | | | | | |
| 200 hr. | 10.76 | 16.74 | 12.12 | 15.32 | 11.78 |
| 400 hr. | 6.62 | 10.27 | 7.46 | 9.06 | 7.10 |
| 600 hr. | 3.31 | 5.58 | 3.73 | 6.26 | 4.33 |
| 800 hr. | 1.66 | 1.90 | 1.87 | 2.37 | 1.91 |
| Exposure to ultraviolet rays (63° C.) | | | | | |
| 100 hr. | 5.79 | 8.93 | 6.53 | 7.98 | 6.41 |
| 200 hr. | 0 | 0 | 0 | 0 | 0 |
| 300 hr. | | | | | |
| 400 hr. | | | | | |

TABLE 7

| | Example | | | | | | |
|---|---|---|---|---|---|---|---|
| | 23 | 24 | 25 | 26 | 27 | 28 | 29 |
| GP3000 | 25 | 37.5 | | 12.5 | | 12.5 | |
| CP3943 | 25 | 25 | 25 | 25 | 30 | 25 | 25 |
| Kurapol F3010 | 25 | 25 | 50 | 50 | 50 | 50 | 50 |
| 3P56B | 25 | 12.5 | 25 | 12.5 | 20 | | |
| New Ace F7-67 | | | | | | 12.5 | 25 |
| TDI80 | 40.3 | 40.3 | 40.3 | 40.3 | 40.1 | 40.3 | 40.3 |
| Index | 110 | 110 | 110 | 110 | 110 | 110 | 110 |
| LV33 | 0.30 | 0.30 | 0.30 | 0.30 | 0.30 | 0.30 | 0.30 |
| Water | 3.00 | 3.00 | 3.00 | 3.00 | 3.00 | 3.00 | 3.00 |
| Silicone | | | | | | | |
| L520 | 1.20 | 1.20 | | | | | |
| SZ1919 | | | 1.50 | 1.50 | 1.50 | 1.50 | 1.50 |
| Stannous octoate | 0.30 | 0.30 | 0.30 | 0.30 | 0.30 | 0.30 | 0.30 |
| Physical properties of foam | | | | | | | |
| Density | 35.6 | 35.3 | 34.8 | 35.2 | 35.6 | 35.6 | 34.9 |
| 25% Hardness | 23.5 | 16.8 | 20.5 | 18.5 | 20.5 | 17.8 | 16.8 |
| Number of cells | 64 | 58 | 65 | 58 | 65 | 60 | 55 |
| Tensile strength | 2.13 | 1.68 | 2.03 | 1.86 | 2.23 | 1.93 | 1.68 |
| Elongation | 190 | 180 | 220 | 200 | 230 | 210 | 190 |
| Air permeability (JIS L1096) | 3.5 | 5.6 | 5.6 | 4.5 | 2.1 | 1.0 | 0.5 |
| % Water absorption at 50% compression | 27.5 | 29.4 | 5.6 | 6.5 | 5.3 | 5.6 | 7.5 |
| % Water absorption at 85% compression | 12.9 | 12.9 | 1.8 | 1.5 | 1.1 | 1.3 | 1.8 |
| Physical properties of product compressed at a factor of 14 | | | | | | | |
| Tensile strength | 26.43 | 23.65 | 25.84 | 25.96 | 25.57 | 28.56 | 22.87 |
| Elongation | 230 | 220 | 220 | 230 | 180 | 260 | 220 |
| Air permeability (JIS P8117) | 31.0 | 24.5 | 21.0 | 32.5 | 47.0 | 330.0 | 460.0 |
| Impermeability to water | | | 24 | 24 | 24 | 72≦ | 72≦ |
| Exposure to wet heat (80° C., 95%) | | | | | | | |
| 400 hr. | 25.37 | 22.23 | 24.55 | 25.18 | 24.04 | 27.42 | 21.50 |
| 800 hr. | 21.80 | 20.10 | 21.96 | 23.10 | 21.73 | 23.56 | 19.44 |
| 1,600 hr. | 20.09 | 16.56 | 19.38 | 20.77 | 17.90 | 21.71 | 16.01 |
| 2,400 hr. | 17.18 | 15.37 | 18.09 | 19.99 | 16.62 | 18.56 | 14.87 |
| Exposure to ozone | | | | | | | |
| 200 hr. | 19.82 | 15.37 | 18.35 | 17.65 | 16.62 | 21.42 | 14.87 |
| 400 hr. | 12.16 | 9.46 | 10.85 | 10.64 | 10.23 | 13.14 | 9.15 |
| 600 hr. | 6.61 | 4.73 | 7.49 | 6.49 | 5.11 | 7.14 | 4.57 |
| 800 hr. | 2.25 | 2.37 | 2.84 | 2.86 | 2.56 | 2.43 | 2.29 |
| Exposure to ultra-violet rays (63° C.) | | | | | | | |
| 100 hr. | 10.57 | 8.28 | 9.56 | 9.61 | 8.95 | 11.42 | 8.00 |
| 200 hr. | 0 | 0 | 0 | 0 | 0 | 0 | 0 |
| 300 hr. | | | | | | | |
| 400 hr. | | | | | | | |

TABLE 8

| | Example | | | | | | |
|---|---|---|---|---|---|---|---|
| | 30 | 31 | 32 | 33 | 34 | 35 | 36 |
| GP3000 | 12.5 | | 12.5 | | 25 | 25 | 25 |
| CP3943 | 25 | 25 | 25 | 25 | 25 | 25 | 25 |
| Kurapol F3010 | 50 | 50 | 50 | 50 | 25 | 25 | 25 |
| New Ace F7-67 | | | | | 25 | | |

TABLE 8-continued

|  | Example | | | | | | |
|---|---|---|---|---|---|---|---|
|  | 30 | 31 | 32 | 33 | 34 | 35 | 36 |
| TA22-248C | 12.5 | 25 |  |  |  | 25 |  |
| Teslac 2458 |  |  | 12.5 | 25 |  |  | 25 |
| TDI80 | 41.5 | 43.9 | 40.6 | 42.1 | 40.3 | 40.3 | 40.9 |
| Index | 110 | 110 | 110 | 110 | 110 | 110 | 110 |
| LV33 | 0.30 | 0.30 | 0.30 | 0.30 | 0.30 | 0.30 | 0.30 |
| Water | 3.00 | 3.00 | 3.00 | 3.00 | 3.00 | 3.00 | 3.00 |
| Silicone SZ1919 | 1.50 | 1.50 | 1.50 | 1.50 | 1.50 | 1.50 | 1.50 |
| Stannous octoate | 0.30 | 0.30 | 0.30 | 0.30 | 0.30 | 0.30 | 0.30 |
| Physical properties of foam |  |  |  |  |  |  |  |
| Density | 34.3 | 35.7 | 35.6 | 34.6 | 34.8 | 35.2 | 34.6 |
| 25% Hardness | 18.0 | 17.4 | 20.5 | 17.3 | 18.0 | 18.0 | 20.5 |
| Number of cells | 56 | 50 | 64 | 58 | 55 | 58 | 56 |
| Tensile strength | 1.85 | 1.82 | 1.95 | 1.68 | 1.75 | 1.65 | 1.82 |
| Elongation | 200 | 190 | 190 | 180 | 200 | 200 | 180 |
| Air permeability (JIS L1096) | 1.4 | 2.1 | 1.3 | 1.6 | 1.2 | 1.5 | 0.7 |
| % Water absorption at 50% compression | 8.5 | 7.5 | 7.5 | 8.1 | 6.5 | 4.5 | 5.3 |
| % Water absorption at 85% compression | 2.8 | 1.5 | 1.4 | 1.4 | 1.8 | 0.9 | 1.1 |
| Physical properties of product compressed at a factor of 14 |  |  |  |  |  |  |  |
| Tensile strength | 27.55 | 24.75 | 26.89 | 27.45 | 27.45 | 24.75 | 24.95 |
| Elongation | 220 | 260 | 240 | 260 | 250 | 220 | 260 |
| Air permeability (JIS P8117) | 520.0 | 245.0 | 295.0 | 335.0 | 325.0 | 310.0 | 450.0 |
| Impermeability to water | 72≦ | 72≦ | 72≦ | 72≦ | 72≦ | 72≦ | 72≦ |
| Exposure to wet heat (80° C., 95%) |  |  |  |  |  |  |  |
| 400 hr. | 26.17 | 24.01 | 25.81 | 25.80 | 26.08 | 24.01 | 23.45 |
| 800 hr. | 23.42 | 22.03 | 22.18 | 23.33 | 23.33 | 22.03 | 21.21 |
| 1,600 hr. | 20.66 | 19.80 | 20.44 | 19.22 | 20.59 | 19.80 | 17.47 |
| 2,400 hr. | 19.29 | 19.06 | 17.48 | 17.84 | 19.22 | 19.06 | 16.22 |
| Exposure to ozone |  |  |  |  |  |  |  |
| 200 hr. | 19.56 | 16.83 | 20.17 | 17.84 | 19.49 | 16.83 | 16.22 |
| 400 hr. | 11.57 | 10.15 | 12.37 | 10.98 | 11.53 | 10.15 | 9.98 |
| 600 hr. | 7.99 | 6.19 | 6.72 | 5.49 | 7.96 | 6.19 | 4.99 |
| 800 hr. | 3.03 | 2.72 | 2.29 | 2.75 | 3.02 | 2.72 | 2.50 |
| Exposure to ultra-violet rays (63° C.) |  |  |  |  |  |  |  |
| 100 hr. | 10.19 | 9.16 | 10.76 | 9.61 | 10.16 | 9.16 | 8.73 |
| 200 hr. | 0 | 0 | 0 | 0 | 0 | 0 | 0 |
| 300 hr. |  |  |  |  |  |  |  |
| 400 hr. |  |  |  |  |  |  |  |

TABLE 9

|  | Example | | | | | |
|---|---|---|---|---|---|---|
|  | 37 | 38 | 39 | 40 | 41 | 42 |
| GP3000 | 25 | 50 | 25 | 50 | 25 | 50 |
| CP3943 | 25 | 25 | 25 | 25 | 25 | 25 |
| Kurapol P2010 | 50 | 25 |  |  |  |  |
| Kurapol F3010 |  |  | 50 | 25 |  |  |
| Placcel 220 |  |  |  |  | 50 | 25 |
| TDI80 | 40.3 | 40.3 | 40.3 | 40.3 | 40.3 | 40.3 |
| Index | 110 | 110 | 110 | 110 | 110 | 110 |
| LV33 | 0.30 | 0.30 | 0.30 | 0.30 | 0.30 | 0.30 |
| Water | 3.00 | 3.00 | 3.00 | 3.00 | 3.00 | 3.00 |
| Silicone SZ1919 | 1.50 | 1.50 | 1.50 | 1.50 | 1.50 | 1.50 |

TABLE 9-continued

|  | Example | | | | | |
|---|---|---|---|---|---|---|
|  | 37 | 38 | 39 | 40 | 41 | 42 |
| Stannous octoate | 0.30 | 0.30 | 0.30 | 0.30 | 0.30 | 0.30 |
| Nocrac CD | 5.0 | 5.0 | 5.0 | 5.0 | 5.0 | 5.0 |
| Sanole LS744 | 1.0 | 1.0 | 1.0 | 1.0 | 1.0 | 1.0 |
| Physical properties of foam | | | | | | |
| Density | 36.5 | 35.9 | 35.2 | 34.9 | 35.4 | 36.0 |
| 25% Hardness | 22.9 | 18.6 | 21.6 | 19.5 | 23.5 | 21.0 |
| Number of cells | 60 | 59 | 64 | 61 | 65 | 59 |
| Tensile strength | 2.23 | 1.85 | 2.20 | 1.91 | 2.35 | 1.97 |
| Elongation | 260 | 220 | 220 | 230 | 250 | 215 |
| Air permeability (JIS L1096) | 0.8 | 1.1 | 1.3 | 1.1 | 0.8 | 0.8 |
| % Water absorption at 50% compression | 5.9 | 6.8 | 5.8 | 4.8 | 7.5 | 4.5 |
| % Water absorption at 85% compression | 1.5 | 1.4 | 1.1 | 1.2 | 1.4 | 1.2 |
| Physical properties of product compressed at a factor of 14 | | | | | | |
| Tensile strength | 28.61 | 25.46 | 28.15 | 23.50 | 27.20 | 28.00 |
| Elongation | 250 | 220 | 230 | 260 | 250 | 210 |
| Air permeability (JIS P8117) | 365.0 | 425.0 | 600.0 | 250.0 | 365.0 | 325.0 |
| Impermeability to water | 72≦ | 72≦ | 72≦ | 72≦ | 72≦ | 72≦ |
| Exposure to wet heat (80° C., 95%) | | | | | | |
| 400 hr. | 26.32 | 23.68 | 25.62 | 22.09 | 25.30 | 25.76 |
| 800 hr. | 24.03 | 21.64 | 23.65 | 20.45 | 23.12 | 23.52 |
| 1,600 hr. | 21.46 | 19.60 | 20.83 | 17.86 | 20.94 | 21.00 |
| 2,400 hr. | 19.17 | 16.80 | 19.14 | 15.04 | 17.95 | 18.76 |
| Exposure to ozone | | | | | | |
| 200 hr. | 24.60 | 20.11 | 21.39 | 18.80 | 21.94 | 20.46 |
| 400 hr. | 17.57 | 15.79 | 17.73 | 14.10 | 18.26 | 16.92 |
| 600 hr. | 13.53 | 11.46 | 13.04 | 10.81 | 13.19 | 12.04 |
| 800 hr. | 10.42 | 10.69 | 12.17 | 9.99 | 8.84 | 10.14 |
| Exposure to ultra-violet rays (63° C.) | | | | | | |
| 100 hr. | 25.46 | 21.64 | 23.93 | 19.98 | 23.12 | 24.92 |
| 200 hr. | 21.46 | 18.33 | 20.27 | 16.92 | 19.58 | 21.00 |
| 300 hr. | 7.15 | 7.13 | 6.47 | 6.58 | 7.62 | 7.00 |
| 400 hr. | 0 | 0 | 0 | 0 | 0 | 0 |

TABLE 10

|  | Example | | | | | |
|---|---|---|---|---|---|---|
|  | 43 | 44 | 45 | 46 | 47 | 48 |
| GP3000 | 25 | 50 | 25 | 12.5 |  | 12.5 |
| CP3943 | 25 | 25 | 25 | 25 | 25 | 25 |
| Kurapol F3010 |  |  |  | 50 | 50 | 50 |
| New Pole F1212-29 | 50 | 25 |  |  |  |  |
| TA22-221 |  |  | 50 |  |  |  |
| New Ace F7-67 |  |  |  | 12.5 | 25 |  |
| TA22-248C |  |  |  |  |  | 12.5 |
| TDI80 | 41.1 | 40.7 | 39.0 | 40.3 | 40.3 | 41.5 |
| Index | 110 | 110 | 110 | 110 | 110 | 110 |
| LV33 | 0.30 | 0.30 | 0.30 | 0.30 | 0.30 | 0.30 |
| Water | 3.00 | 3.00 | 3.00 | 3.00 | 3.00 | 3.00 |
| Silicone SZ1919 | 1.50 | 1.50 | 1.50 | 1.50 | 1.50 | 1.50 |
| Stannous octoate | 0.30 | 0.30 | 0.30 | 0.30 | 0.30 | 0.30 |
| Nocrac CD | 5.0 | 5.0 | 5.0 | 5.0 | 5.0 | 5.0 |
| Sanole LS744 | 1.0 | 1.0 | 1.0 | 1.0 | 1.0 | 1.0 |

TABLE 10-continued

| | Example | | | | | |
|---|---|---|---|---|---|---|
| | 43 | 44 | 45 | 46 | 47 | 48 |
| Physical properties of foam | | | | | | |
| Density | 34.8 | 34.9 | 35.1 | 37.6 | 36.8 | 37.2 |
| 25% Hardness | 20.1 | 18.5 | 21.5 | 16.8 | 15.6 | 17.1 |
| Number of cells | 55 | 58 | 62 | 60 | 59 | 56 |
| Tensile strength | 2.35 | 1.79 | 2.15 | 1.88 | 1.75 | 1.76 |
| Elongation | 250 | 200 | 230 | 230 | 200 | 210 |
| Air permeability (JIS L1096) | 0.9 | 0.7 | 0.5 | 0.8 | 1.1 | 1.3 |
| % Water absorption at 50% compression | 3.9 | 3.4 | 5.3 | 5.9 | 6.8 | 5.8 |
| % Water absorption at 85% compression | 0.8 | 0.7 | 1.1 | 1.5 | 1.4 | 1.1 |
| Physical properties of product compressed at a factor of 14 | | | | | | |
| Tensile strength | 27.35 | 27.50 | 26.50 | 28.61 | 23.75 | 28.15 |
| Elongation | 250 | 220 | 260 | 250 | 220 | 230 |
| Air permeability (JIS P8117) | 350.0 | 315.0 | 450.0 | 370.0 | 500.0 | 660.0 |
| Impermeability to water | 72≦ | 72≦ | 72≦ | 72≦ | 72≦ | 72≦ |
| Exposure to wet heat (80° C., 95%) | | | | | | |
| 400 hr. | 24.89 | 25.58 | 24.38 | 26.32 | 22.09 | 25.62 |
| 800 hr. | 22.97 | 23.38 | 22.26 | 24.03 | 20.19 | 23.65 |
| 1,600 hr. | 20.24 | 21.18 | 19.88 | 21.46 | 18.29 | 20.83 |
| 2,400 hr. | 18.60 | 18.15 | 17.76 | 19.17 | 15.68 | 19.14 |
| Exposure to ozone | | | | | | |
| 200 hr. | 21.42 | 22.18 | 21.19 | 22.77 | 17.97 | 22.70 |
| 400 hr. | 15.44 | 17.18 | 16.54 | 17.29 | 13.02 | 18.16 |
| 600 hr. | 12.40 | 12.75 | 12.27 | 15.16 | 11.01 | 16.70 |
| 800 hr. | 10.19 | 8.94 | 9.33 | 11.50 | 7.72 | 9.15 |
| Exposure to ultra-violet rays (63° C.) | | | | | | |
| 100 hr. | 23.25 | 23.38 | 23.59 | 25.46 | 20.19 | 23.93 |
| 200 hr. | 19.69 | 19.80 | 19.88 | 21.46 | 17.10 | 20.27 |
| 300 hr. | 6.29 | 7.70 | 6.63 | 7.15 | 6.65 | 6.47 |
| 400 hr. | 0 | 0 | 0 | 0 | 0 | 0 |

TABLE 11

| | Example | | | | | |
|---|---|---|---|---|---|---|
| | 49 | 50 | 51 | 52 | 53 | 54 |
| GP3000 | | 12.5 | | 25 | 25 | 25 |
| CP3943 | 25 | 25 | 25 | 25 | 25 | 25 |
| Kurapol F3010 | 50 | 50 | 50 | 25 | 25 | 25 |
| New Ace F7-67 | | | | 25 | | |
| TA22-248C | 25 | | | | 25 | |
| Teslac 2458 | | 12.5 | 25 | | | 25 |
| TDI80 | 40.9 | 40.6 | 40.9 | 40.3 | 40.3 | 42.7 |
| Index | 110 | 110 | 110 | 110 | 110 | 110 |
| LV33 | 0.30 | 0.30 | 0.30 | 0.30 | 0.30 | 0.30 |
| Water | 3.00 | 3.00 | 3.00 | 3.00 | 3.00 | 3.00 |
| Silicone SZ1919 | 1.50 | 1.50 | 1.50 | 1.50 | 1.50 | 1.50 |
| Stannotis octoate | 0.30 | 0.30 | 0.30 | 0.30 | 0.30 | 0.30 |
| Nocrac CD | 5.0 | 5.0 | 5.0 | 5.0 | 5.0 | 5.0 |
| Sanole LS744 | 1.0 | 1.0 | 1.0 | 1.0 | 1.0 | 1.0 |

TABLE 11-continued

| | Example | | | | | |
|---|---|---|---|---|---|---|
| | 49 | 50 | 51 | 52 | 53 | 54 |
| Physical properties of foam | | | | | | |
| Density | 38.2 | 37.9 | 38.9 | 34.8 | 38.2 | 38.6 |
| 25% Hardness | 16.5 | 20.5 | 17.2 | 17.5 | 16.5 | 19.6 |
| Number of cells | 61 | 65 | 59 | 55 | 58 | 62 |
| Tensile strength | 1.82 | 1.90 | 1.73 | 1.86 | 1.79 | 1.82 |
| Elongation | 200 | 200 | 190 | 200 | 200 | 230 |
| Air permeability (JIS L1096) | 1.1 | 0.8 | 0.8 | 0.9 | 0.7 | 0.5 |
| % Water absorption at 50% compression | 4.8 | 7.5 | 4.5 | 3.9 | 3.4 | 5.3 |
| % Water absorption at 85% compression | 1.2 | 1.4 | 1.2 | 0.8 | 0.7 | 1.1 |
| Physical properties of product compressed at a factor of 14 | | | | | | |
| Tensile strength | 25.25 | 27.15 | 28.00 | 27.35 | 25.25 | 26.10 |
| Elongation | 260 | 240 | 260 | 250 | 220 | 260 |
| Air permeability (JIS P8117) | 240.0 | 350.0 | 315.0 | 330.0 | 300.0 | 470.0 |
| Impermeability to water | 72≦ | 72≦ | 72≦ | 72≦ | 72≦ | 72≦ |
| Exposure to wet heat (80° C., 95%) | | | | | | |
| 400 hr. | 23.74 | 25.25 | 25.76 | 24.89 | 23.48 | 24.01 |
| 800 hr. | 21.97 | 23.08 | 23.52 | 22.97 | 21.46 | 21.92 |
| 1,600 hr. | 19.19 | 20.91 | 21.00 | 20.24 | 19.44 | 19.58 |
| 2,400 hr. | 16.16 | 17.92 | 18.76 | 18.60 | 16.67 | 17.49 |
| Exposure to ozone | | | | | | |
| 200 hr. | 20.12 | 21.62 | 21.86 | 23.66 | 20.36 | 20.78 |
| 400 hr. | 16.02 | 16.96 | 16.64 | 17.08 | 15.27 | 16.29 |
| 600 hr. | 13.43 | 13.40 | 12.19 | 12.40 | 12.71 | 12.08 |
| 800 hr. | 9.15 | 8.82 | 10.70 | 9.37 | 10.73 | 9.19 |
| Exposure to ultraviolet rays (63° C.) | | | | | | |
| 100 hr. | 21.46 | 23.08 | 24.92 | 23.25 | 21.46 | 23.23 |
| 200 hr. | 18.18 | 19.55 | 21.00 | 19.69 | 18.18 | 19.58 |
| 300 hr. | 7.07 | 7.60 | 7.00 | 6.29 | 7.07 | 6.53 |
| 400 hr. | 0 | 0 | 0 | 0 | 0 | 0 |

The results set forth in Tables 1 and 2 show that the polyester foam of Comparative Example 1 exhibits excellent initial tensile strength and elongation and a relatively good resistance to ozone deterioration in the form of compressed product but shows a poor resistance to wet heat aging. It can be also seen in these results that the polyether foam of Comparative Example 2 exhibits a good resistance to wet heat aging but shows a reduced strength and elongation and a poor resistance to ozone deterioration in the form of compressed product. Further, the polyether foam of Comparative Example 3, which has been prepared from two kinds of polyether polyols in combination, shows no enhancement of strength and elongation. Moreover, the foams of Comparative Examples 4 to 6, 8 and 9, which have been prepared from a polyether polyol and a polyester-polyether polyol in combination, and the foam of Comparative Example 7, which has been prepared from a polyester polyether polyol only as the polyol, show no enhancement of strength and elongation and leave something to be desired in the enhancement of resistance to ozone deterioration.

On the other hand, the results set forth in Tables 3 and 4 show that the foams of Examples 1 to 12, which have been prepared from a long-chain polyester polyol and a polyether polyol in combination, exhibit relatively enhanced strength and elongation and relatively improved resistance to wet heat aging and resistance to ozone deterioration. The degree of the improvement of these properties depends on the kind of the long-chain polyester polyol used. In particular, the foams of Examples 3 and 4 or Examples 7 and 8 exhibit almost the same strength as that of the polyester foam and relatively enhanced resistance to wet heat aging and resistance to ozone deterioration.

FIG. 1 graphically illustrates the results of the resistance to wet heat aging of Comparative Examples 1 and 2 and Examples 3 and 4. It can be seen also in FIG. 1 that the foams of Examples 3 and 4 exhibit an initial strength far exceeding that of the polyether foam and an excellent resistance to wet heat aging similar to the polyester foam.

The results set forth in Tables 5 and 6 show that the foams of Examples 13 to 22, which have been prepared from 25% by weight of a polyester-polyether polyol in addition to the other polyols, show no big difference in strength, elongation and resistance to ozone deterioration from those of Examples 1 to 12. Further, the compositions of Examples 13 to 22 exhibit an enhanced compatibility with the long-chain polyester polyol and polyether polyol and thus do not suffer separation even when allowed to stand after mixing. Thus, these compositions can undergo even more stable reaction. Moreover, the results set forth in Tables 7 and 8 show that the foams of Examples 23 to 36 according to the above item (5) or (10), which have been prepared from 25 to 30% by weight of a polymer polyol, exhibit a remarkably enhanced strength after compression molding regardless of the kind of the long-chain polyester polyol used.

The results set forth in Tables 9 to 11 show that the foams of Examples 37 to 54 according to the above item (6), (7), (11) or (12) exhibit a very high strength and remarkably improved resistance to ozone deterioration and resistance to wet heat aging. These results also show that the incorporation of an ultraviolet absorbent provides a remarkable improvement of weather resistance.

Figure 2:
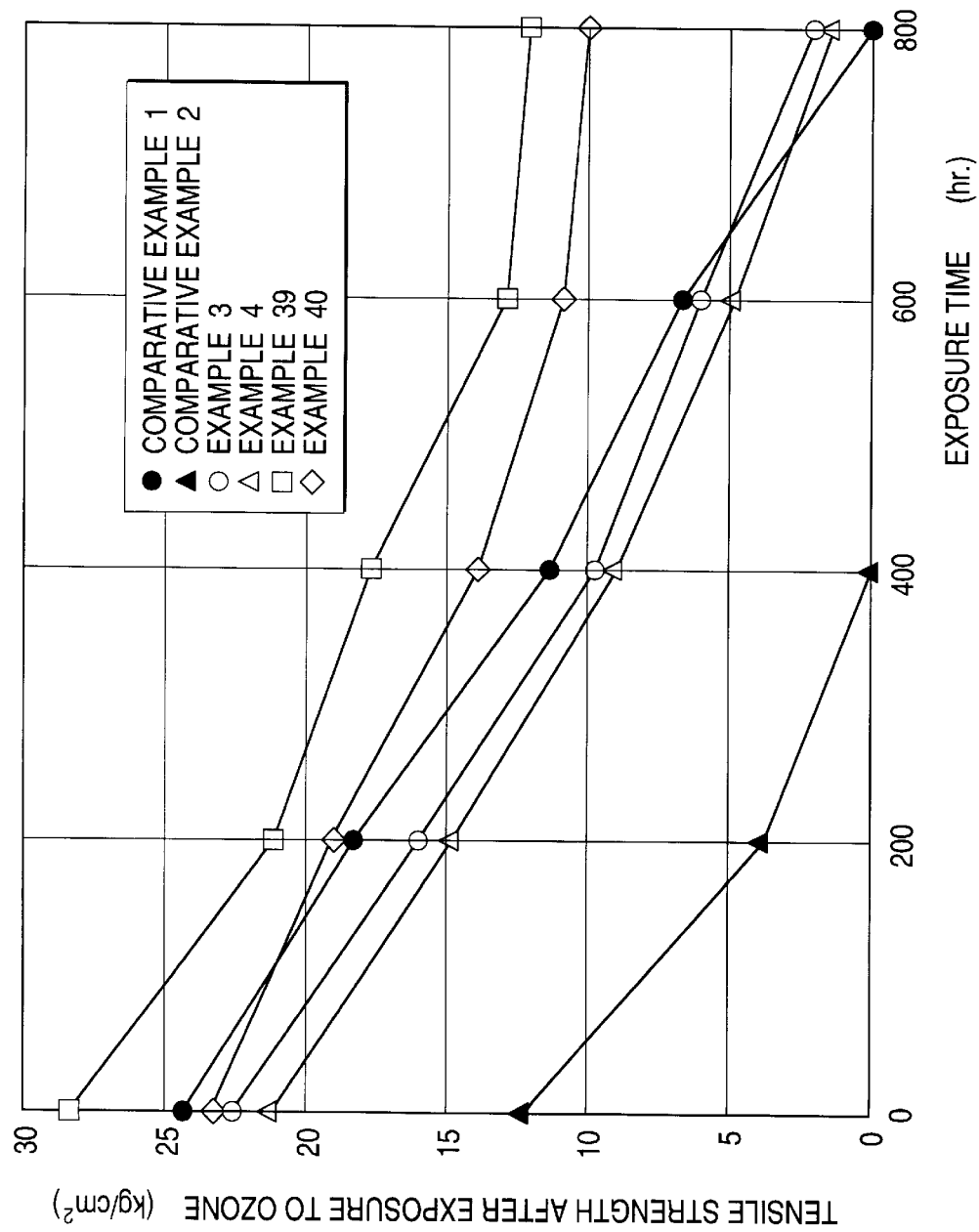
FIG. 2 graphically illustrates the resistance to ozone deterioration of the flexible foams of Comparative Examples 1 and 2 and Examples 3, 4, 39 and 40.

FIG. 2 graphically illustrates the results of the resistance to ozone deterioration of the foams of Comparative Examples 1 and 2 and Examples 3, 4, 39 and 40. It can be seen also in FIG. 2 that the foams of Examples 3 and 4 exhibit an initial strength similar to that of the polyester foam and an excellent resistance to ozone deterioration similar to the polyester foam. These results also show that the foams of Examples 39 and 40 exhibit the same or higher initial strength than the polyester foam and a higher resistance to ozone deterioration than the polyester foam.

Figure 3:
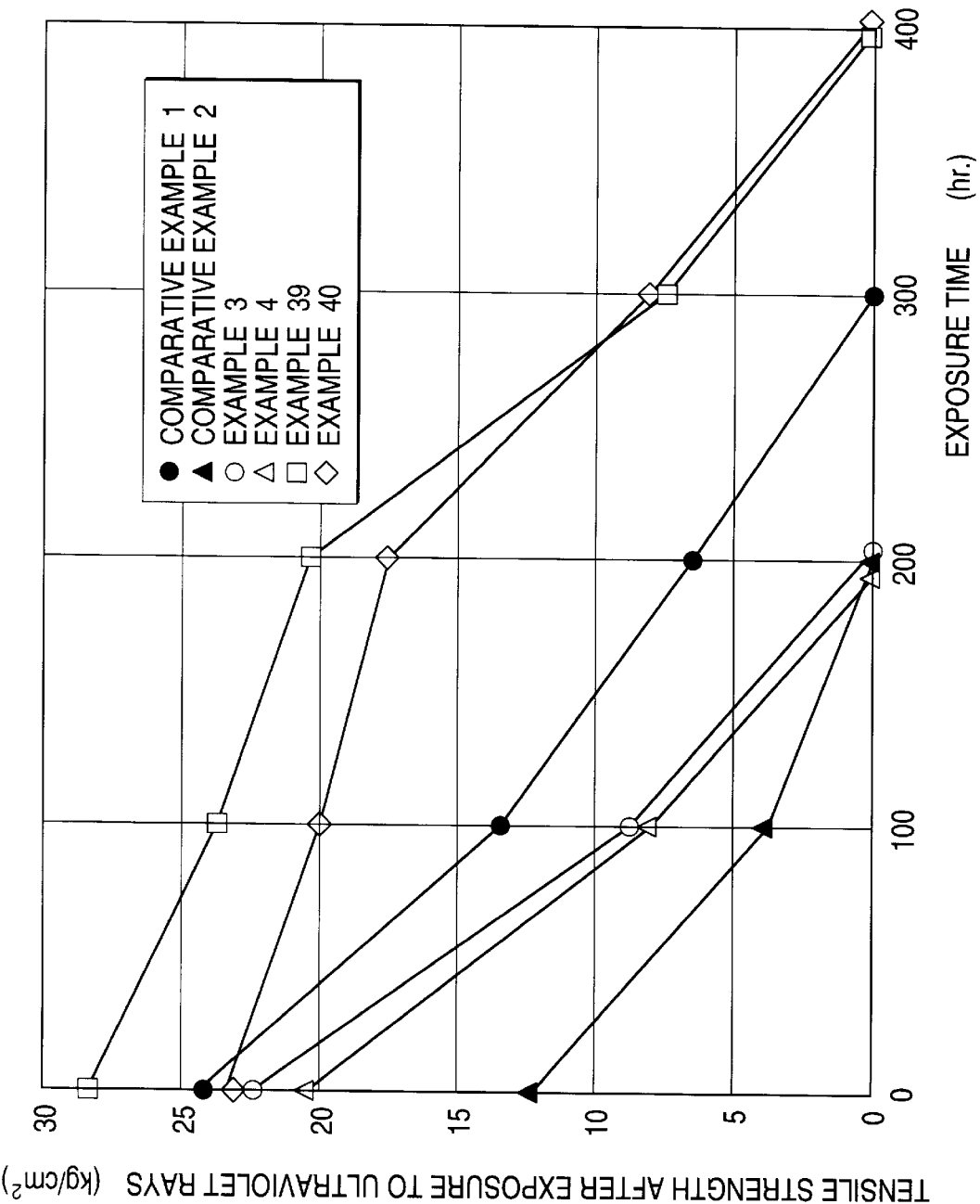
FIG. 3 graphically illustrates the weather resistance of the flexible foams of Comparative Examples 1 and 2 and Examples 3, 4, 39 and 40.

FIG. 3 graphically illustrates the results of the weather resistance of the foams of Comparative Examples 1 and 2 and Examples 3, 4, 39 and 40. FIG. 3 shows that the foams of Examples 3 and 4 exhibit a lower weather resistance than the polyester foam but show a relatively improved weather resistance as compared with the polyether foam. FIG. 3 also shows that the foams of Examples 30 and 40 exhibit a weather resistance far exceeding that of the polyester foam.

In Examples 37 to 54, monofunctionally-terminated compounds according to the above item (7) or (11) (in this case, Silicone SZ1919, which is a foam stabilizer, acts as a monofunctionated-terminated compound) are used. This causes a big drop of the air permeability and compression water absorption of the foams. The resulting compressed products have a very low air permeability falling within a desirable range. All these examples exhibit a water-impermeability of at least 72 hours and thus can provide flexible foams having a very excellent water impermeability.

Referring to air permeability, the air permeability before compression preferably falls within a proper range as in Example 40 as can be seen in Table 12. Comparative Example 1 shows good results of air permeability. However, if the foam has a very high air permeability as in Comparative Example 2, the foam exhibits too high an air permeability also after compressed at any compressibility (In most cases, the air permeability is not more than 3 seconds; the smaller this value is, the higher is the air permeability). Thus, a foam having poor air sealing properties and water-impermeability is provided.

TABLE 12

|  | Comp. Ex. 1 | Comp. Ex. 2 | Ex. 40 |
|---|---|---|---|
| Before compression (JIS L1096) | 8.3 | 121 | 1.1 |
| After compression |  |  |  |
| Thickness 5 - 0.5 mm (10 times) | 3≧ | 3≧ | 92.0 |
| Thickness 6 - 0.5 mm (12 times) | 5.5 | 3≧ | 134.0 |
| Thickness 7 - 0.5 mm (14 times) | 17.5 | 3≧ | 275.0 |

TABLE 12-continued

|  | Comp. Ex. 1 | Comp. Ex. 2 | Ex. 40 |
|---|---|---|---|
| Thickness 8 - 0.5 mm (16 times) | 65.0 | 3≧ | 325.0 |
| Thickness 9 - 0.5 mm (18 times) | 115.0 | 3≧ | 485.0 |
| Thickness 10 - 0.5 mm (20 times) | 265.0 | 5.3 | 720.0 |

In the various comparative examples, the number of cells is not more than 50/25 mm in some cases. Thus, these foam cells are relatively large. On the other hand, in the various examples, the number of cells is at least 50/25 mm, at least 55/25 mm in most cases. In particular, when a polyester-polyether polyol and a polymer polyol are used in combination, the number of cells is at least 60/25 mm in most cases. Thus, these foam cells are relatively small. From this standpoint, too, it can be seen that the use of the flexible foam of the present invention makes it easy to provide a speaker edge having a stable water-impermeability.

As defined in the above item (1), the combined use of a specific polyester polyol having a good compatibility with polyether polyol and a polyether polyol as polyols makes it possible to obtain a flexible foam having relatively improved resistance to wet heat aging and resistance to ozone deterioration. Further, the combined use of a polyester-polyether polyol or the like as defined in the above item (3) and a polyester polyol having a secondary terminal hydroxyl group as defined in the above item (4) makes it possible to further enhance the compatibility of the foregoing specific polyester polyol with polyether polyol.

Further, as defined in the above item (9), the use of a specific polyester polyol according to the above items (3) and (4) makes it possible to obtain a flexible foam having excellent properties as in the above item (1). As defined in the above item (5) or (10), the additional use of a polymer polyol makes it possible to obtain a foam having a higher strength. As defined in the above item (6) or (11), the use of a specific secondary amine compound makes it possible to improve the resistance to ozone deterioration of the foam. Moreover, as defined in the above item (7) or (12), the incorporation of a specific monofunctionally-terminated compound provides a drastic drop of water-absorption and air permeability, making it possible to obtain a foam having a proper air permeability. Finally, as defined in the above item (8) or (13), the use of specific flexible foams defined in the above items (1) to (7) and (9) to (12) makes it possible to obtain a speaker edge excellent in water-impermeability and weather resistance.

While the invention has been described in detail and with reference to specific embodiments thereof, it will be apparent to one skilled in the art that various changes and modifications can be made therein without departing from the spirit and scope thereof.

What is claimed is:

1. A flexible polyurethane foam obtained by the reaction of a composition comprising:
   (a) a polyisocyanate, and
   (b) a polyol component comprising a polyether polyol and a polyester polyol, said polyester polyol having a total number of hydrocarbon groups "n" between ester moieties, such that at least n/3 of said hydrocarbon groups have 5 or more carbon atoms, said polyester polyol being prepared by one of the following reactions:
      (i) reacting a long-chain polyvalent alcohol with a long-chain dibasic acid;

37

(ii) reacting a long-chain polyvalent alcohol with a short-chain dibasic acid; or
(iii) reacting a short-chain polyvalent alcohol with a long-chain dibasic acid;

wherein the following definitions apply to reactions (i), (ii) and (iii): the long-chain polyvalent alcohol is a polyvalent dimer diol having a hydrocarbon group having at least 5 carbon atoms; the short-chain polyvalent alcohol is a polyvalent alcohol having a hydrocarbon group having not more than 4 carbon atoms; the long-chain dibasic acid is a dibasic dimeric acid having a hydrocarbon group having at least 5 carbon atoms; and the short-chain dibasic acid is a dibasic acid having a hydrocarbon group having not more than 4 carbon atoms.

2. The flexible polyurethane foam according to claim 1, wherein the proportion of the polyester polyol is not more than 50% by weight based on 100% by weight of the sum of the content of the polyester polyol and the polyether polyol.

3. The flexible polyurethane foam according to claim 1, wherein the polyol component (b) comprises the polyether polyol, the polyester polyol, and a polyester-polyether polyol, and further wherein the polyester-polyether polyol is a hydroxyl compound having ester bonds and ether bonds per molecule.

4. The flexible polyurethane foam according to claim 1, wherein the polyol or component (b) comprises the polyether polyol, the polyester polyol as a first polyester polyol, and a second polyester polyol, the second polyester polyol having a secondary terminal hydroxyl group obtained by the condensation of 1,2-propylene glycol or 1,3-butanediol with a dibasic acid.

5. The flexible polyurethane foam according to claim 1, wherein the polyol component further comprises a polymer polyol.

6. The flexible polyurethane foam according to claim 1, wherein the composition further comprises an aromatic secondary amine compound in an amount of from 1 to 25 parts by weight based on 100 parts by weight of the polyol contained in the polyol component.

7. The flexible polyurethane foam according to claim 1, wherein the composition further comprises a monofunctionally-terminated compound selected from the group consisting of a monoisocyanate, a monoamine, a monoalcohol and a silicone foam stabilizer terminated by a hydroxyl group.

8. The flexible polyurethane foam according to claim 7, wherein the monofunctionally-terminated compound is present in a ratio of from 0.1 to 35 parts by weight based on 100 parts by weight of the sum of the amount of polyisocyanate and polyol.

9. The flexible polyurethane foam according to claim 7, wherein the monofunctionally-terminated compound is previously incorporated in said polyol component and is a monoamine or a monoalcohol, or the monofunctionally-terminated compound is previously incorporated in said polyisocyanate and is a monoisocyanate.

10. The flexible polyurethane foam according to claim 1, formed as a speaker edge.

11. A flexible polyurethane foam comprising the reaction products of a composition that comprises:
(a) a polyisocyanate; and
(b) a polyol component comprising a polyether polyol and a polyester polyol, the polyester polyol
(i) having hydrocarbon groups between its ester moieties which all have 5 or more carbon atoms,
(ii) being obtained by condensation reaction of a polyvalent alcohol with a dibasic acid or ring-opening polymerization of a cyclic compound, and

38

(iii) the hydroxyl number being from 40 to 120 mgKOH/g, wherein the proportion of the polyester polyol is not more than 50% by weight based on 100% by weight of the sum of the content of the polyester polyol and the polyether polyol.

12. The flexible polyurethane foam according to claim 11, wherein said polyester polyol is prepared by the following reaction:

reacting a long-chain polyvalent alcohol with a long-chain dibasic acid;

wherein the following definitions apply: the long-chain polyvalent alcohol is a polyvalent alcohol having a hydrocarbon group having at least 5 carbon atoms; and the long-chain dibasic acid is a dibasic acid having a hydrocarbon group having at least 5 carbon atoms.

13. The flexible polyurethane foam according to claim 11, wherein the polyol component further comprises a polyester polyol having a secondary terminal hydroxyl group obtained by the condensation of 1,2-propylene glycol or 1,3-butanediol with a dibasic acid.

14. The flexible polyurethane foam according to claim 11, wherein the polyol component further comprises a polymer polyol.

15. The flexible polyurethane foam according to claim 11, wherein the composition further contains an aromatic secondary monoamine compound in an amount of from 1 to 25 parts by weight based on 100 parts by weight of the polyol contained in the polyol component.

16. The flexible polyurethane foam according to claim 11, wherein the composition further comprises a monofunctionally-terminated compound selected from the group consisting of a monoisocyanate, a monoamine, a monoalcohol and a silicone foam stabilizer terminated by a hydroxyl group.

17. The flexible polyurethane foam according to claim 16, wherein the monofunctionally-terminated compound is present in a ratio of from 0.1 to 35 parts by weight based on 100 parts by weight of the sum of the amount of polyisocyanate and polyol.

18. The flexible polyurethane foam as claimed in claim 16, wherein the monofunctionally-terminated compound is previously incorporated in said polyol component and is a monoamine or a monoalcohol, or the monofunctionally-terminated compound is previously incorporated in said polyisocyanate and is a monoisocyanate.

19. The flexible polyurethane foam according to claim 11, wherein the polyol component (b) comprises the polyether polyol, the polyester polyol, and a polyester-polyether polyol, and further wherein the polyester-polyether polyol is a hydroxyl compound having ester bonds and ether bonds per molecule.

20. The flexible polyurethane foam according to claim 11, formed as a speaker edge.

21. A flexible polyurethane foam comprising the reaction products of a composition that comprises:
(a) a polyisocyanate;
(b) a polyol component comprising a polyether polyol and a polyester polyol, said polyester polyol having a total number of hydrocarbon groups "n" between ester moieties, such that at least n/2 of said hydrocarbon groups have 5 or more carbon atoms;
(c) 1–25 parts by weight of an aromatic secondary amine compound based on 100 parts by weight of the polyol contained in the polyol component (b); and
(d) in addition to (c), any one of monoalcohol, monoamine, and monoisocyanate, or a combination of two or more of them, wherein the monoalcohol, monoamine, and monoisocyanate have a hydrocarbon group having at least 5 carbon atoms.

22. The flexible polyurethane foam according to claim 21, wherein said polyester polyol is prepared by one of the following reactions:
(1) reacting a long-chain polyvalent alcohol with a long-chain dibasic acid;
(2) reacting a long-chain polyvalent alcohol with a short-chain dibasic acid; or
(3) reacting a short-chain polyvalent alcohol with a long-chain dibasic acid; wherein the following definitions apply to reactions (1), (2) and (3): the long-chain polyvalent alcohol is a polyvalent alcohol having a hydrocarbon group having at least 5 carbon atoms; the short-chain polyvalent alcohol is a polyvalent alcohol having a hydrocarbon group having not more than 4 carbon atoms; the long-chain dibasic acid is a dibasic acid having a hydrocarbon group having at least 5 carbon atoms; and the short-chain dibasic acid is a dibasic acid having a hydrocarbon group having not more than 4 carbon atoms.

* * * * *